United States Patent [19]

Matsuo et al.

[11] Patent Number: 4,958,716

[45] Date of Patent: Sep. 25, 1990

[54] APPARATUS FOR CONVEYING ARTICLES

[75] Inventors: Yukito Matsuo; Tsuyoshi Ishida, both of Yokohama; Masanori Iwamoto, Tokyo, all of Japan

[73] Assignee: Kabushiki Kaisha Toshiba, Kanagawa, Japan

[21] Appl. No.: 103,733

[22] Filed: Oct. 2, 1987

[30] Foreign Application Priority Data

Oct. 9, 1986 [JP] Japan ................................. 61-239158
Oct. 9, 1986 [JP] Japan ................................. 61-239159

[51] Int. Cl.$^5$ .............................................. B65G 47/74
[52] U.S. Cl. .................................. 198/346.1; 414/411; 414/331; 198/465.1; 198/347.1
[58] Field of Search .................... 406/2; 414/331, 441; 198/346.1, 346.2, 347, 367, 372, 365, 465.1, 465.2; 53/285

[56] References Cited

U.S. PATENT DOCUMENTS

| | | | |
|---|---|---|---|
| 2,440,120 | 4/1948 | Ringler | 53/285 X |
| 3,122,231 | 2/1964 | Pence et al. | 198/347 |
| 3,179,269 | 4/1965 | Arnett | 414/411 |
| 3,212,623 | 10/1965 | Griffith | 198/597 X |
| 3,397,509 | 8/1968 | Ullman | 53/285 |
| 3,406,928 | 10/1968 | Thorburn | 406/2 |
| 3,410,501 | 11/1968 | Thorburn | 406/2 |
| 3,610,159 | 10/1971 | Fickenscher . | |
| 3,616,762 | 11/1971 | Benner . | |
| 3,648,819 | 3/1972 | Converse, III et al. | 198/346.1 |
| 3,675,585 | 7/1972 | Whart et al. . | |
| 3,696,752 | 10/1972 | Bourg . | |
| 3,803,556 | 4/1974 | Duffy | 414/134 X |
| 3,834,316 | 9/1974 | Hennings . | |
| 3,892,372 | 7/1975 | Hauber | 406/2 |
| 3,904,942 | 9/1975 | Holtz . | |
| 3,912,991 | 10/1975 | Moyse . | |
| 4,084,770 | 4/1978 | Warmann | 406/2 X |
| 4,144,960 | 3/1979 | Scourtes . | |
| 4,191,005 | 3/1980 | Vinoskey | 414/411 X |
| 4,519,491 | 5/1985 | Prodel et al. | 198/465.1 |
| 4,613,805 | 9/1986 | Matsuo et al. . | |
| 4,615,273 | 10/1986 | Osthus et al. | 198/346.1 |
| 4,643,291 | 2/1987 | Counter et al. | 198/367 X |
| 4,658,947 | 4/1987 | Welder | 198/346.2 |
| 4,665,349 | 5/1987 | Matsuo . | |
| 4,732,256 | 3/1988 | Dorner | 198/347 |
| 4,805,759 | 2/1989 | Rochet et al. | 198/346.1 |

FOREIGN PATENT DOCUMENTS

| | | | |
|---|---|---|---|
| 0093863 | 11/1983 | European Pat. Off. . | |
| 2536433 | 2/1977 | Fed. Rep. of Germany | 198/472 |
| 2557767 | 6/1977 | Fed. Rep. of Germany | 198/597 |
| 48306 | 3/1984 | Japan | 414/331 |
| 102703 | 6/1984 | Japan | 414/331 |
| 87108 | 5/1985 | Japan | 414/331 |
| 211044 | 6/1983 | United Kingdom . | |
| 2121366 | 12/1983 | United Kingdom . | |
| 2124989 | 2/1984 | United Kingdom . | |
| 2168938 | 7/1986 | United Kingdom . | |

Primary Examiner—Joseph E. Valenza
Assistant Examiner—D. Glenn Dayoan
Attorney, Agent, or Firm—Banner, Birch, McKie & Beckett

[57] ABSTRACT

An apparatus for conveying carrier cases between different locations in a building includes a main conveyance path. A plurality of stations is located along the path so that each station is located in a different room. The main conveyance path includes a linear induction system for moving the cases between the stations. The stations include a stop position located on the main conveyance path and a branch conveyance path adjacent the stop position. Each branch conveyance path includes a horizontal storage section with two conveyer belts and a subconveying section which includes a reversible vertically disposed conveyer belt with a horizontal portion adjacent to one horizontal belt. The subconveying section extends to an input/output section which opens into the room. One embodiment of the input/output section is provided with a plurality of storage positions located in a U-shaped configuration and belts to automatically move the cases along the positions. An input position includes an automatic opening device for the carrier cases and an output position includes an automatic closing device.

45 Claims, 16 Drawing Sheets

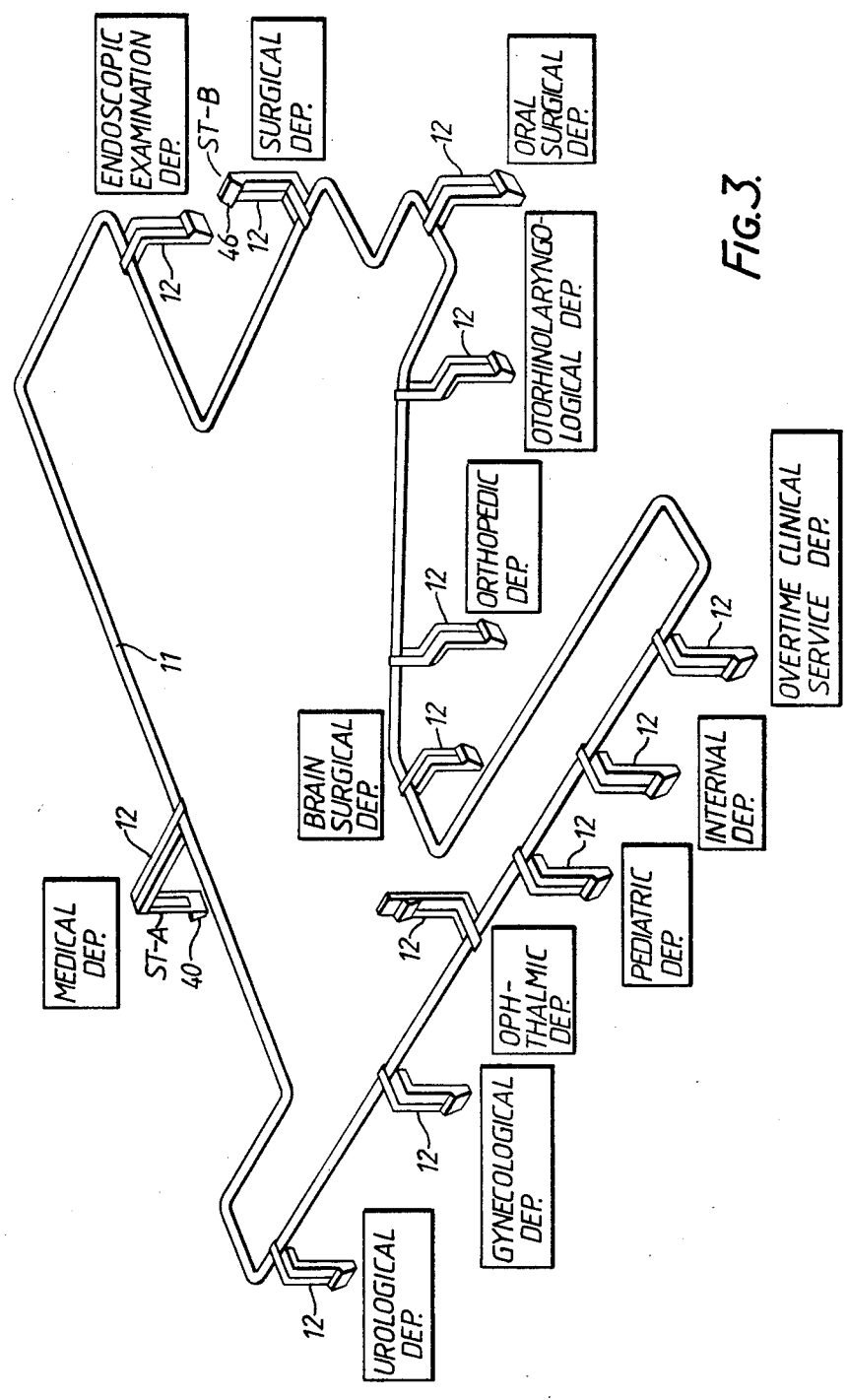

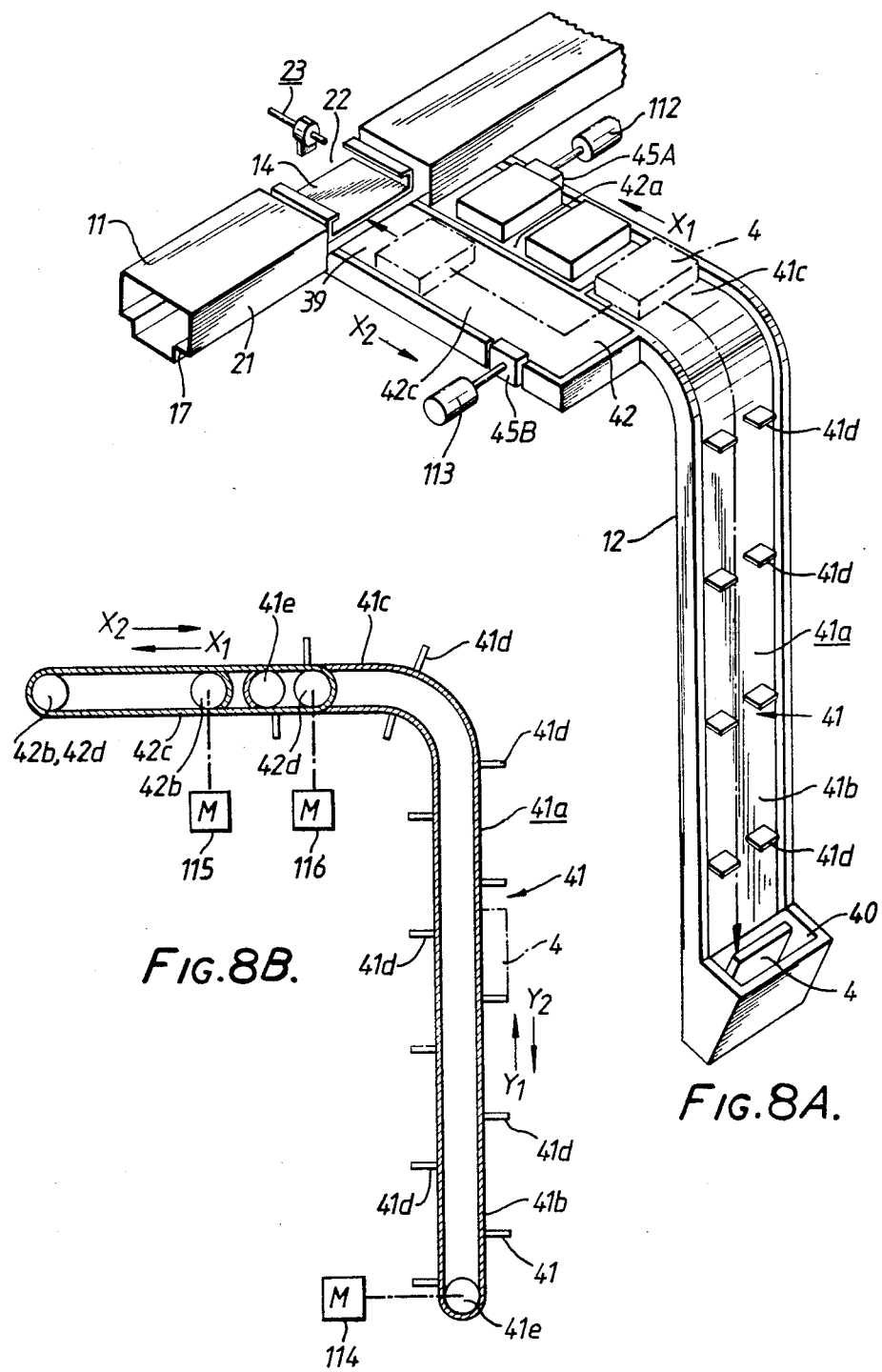

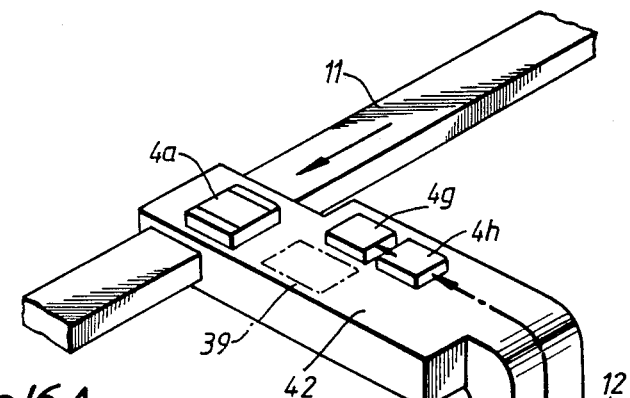
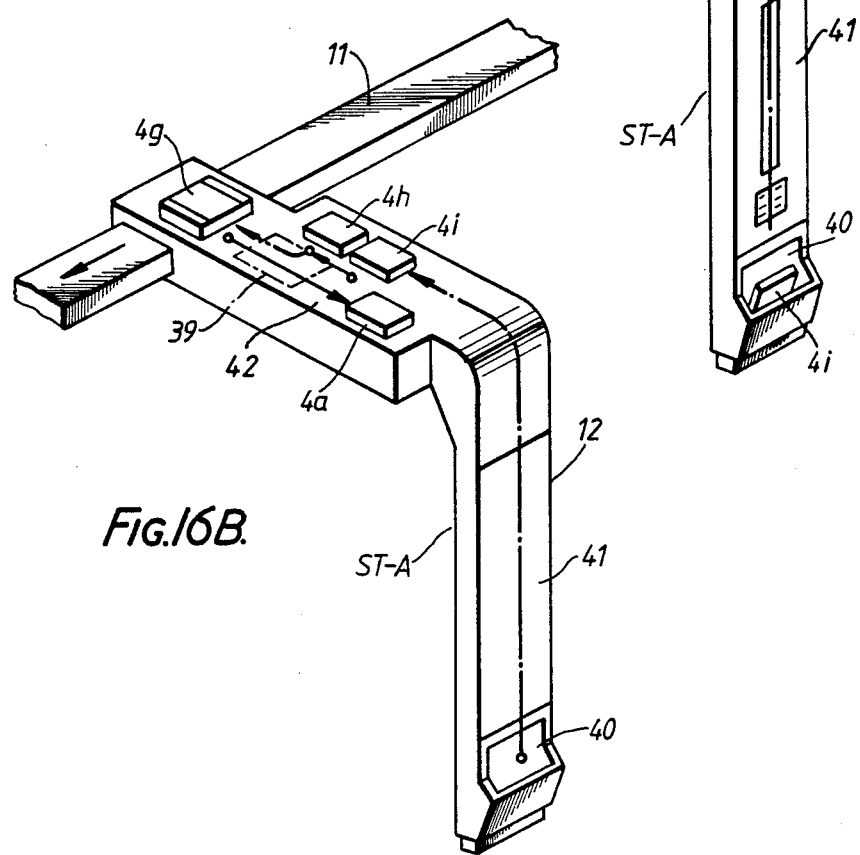
FIG.16A.
FIG.16B.

APPARATUS FOR CONVEYING ARTICLES

BACKGROUND OF THE INVENTION

1. Field of the Invention

The present invention relates to an apparatus for conveying articles from one location to one of a plurality of other locations in a large building. In particular, although not necessarily limited thereto, this invention may be used in a hospital to convey charts, slips, medicine, and other miscellaneous articles from a first location or department to a second designated location or department in the hospital.

2. Description of the Related Art

Copending U.S. Application No. 938,644 now U.S. Pat. No. 4,817,694 to Matsuo et al, and assigned to Toshiba K. K. was filed on Dec. 5, 1986, and discloses an apparatus for conveying carrier cases containing articles. This apparatus includes a main conveying path and a plurality of stations located along the main conveying path. The stations are spaced along the path. A subconveying mechanism extends laterally from the main conveying path at each station. The subconveying mechanism includes a receipt/delivery section and a subconveying section. Carrier cases which are transferred from a station to the receipt/delivery section are delivered by the subconveying section to a receipt section. Carrier cases which are placed in a supply section are delivered by the subconveying mechanism to the receipt/delivery section and are then transferred to the main conveying path.

The subconveying section includes a subconveying path with a pair of adjacent, vertically stretched conveyer belts. The supply section and the receipt section are adjacent to each other and are at one end of the pair of conveyer belts. One of the vertical conveyer belts conveys carrier cases downwardly from the receipt/delivery section to the receipt section while the other vertical conveyer belt conveys carrier cases upwardly from the supply section to the receipt/delivery section. A lateral conveyer belt is provided orthogonally to the lower end portions of the vertical conveyer belts within a housing for the receipt section and the supply section. When the carrier cases arrive at the receipt section after descending down the first conveyer belt, the lateral conveyer belt conveys the carrier cases forwardly from the bottom of the subconveying section to the receipt section. If an operator places a carrier case in the supply section, the lateral conveying belt is reversed in order to convey the carrier cases backwardly toward the second vertical conveyer belt. The carrier case is transferred onto the vertical conveying belt which carries it upwardly to a position adjacent the receipt/delivery section. A transferring device pushes the carrier case onto the receipt/delivery section. The receipt/delivery section extends laterally and orthogonally to the vertical conveyer belts and is in the same plane as the main conveying path.

In the above described apparatus, there are no coupling means for coupling the receipt section to the supply section to automatically move the carrier cases between the two sections. Thus, carrier cases must be moved by an operator between the receipt section and the supply section. Furthermore, the apparatus has no provision for means to automatically open and close the carrier cases. There is also no provision for a storage section located between the receipt/delivery section and the subconveying section to provide for efficient exchange of carrier cases therebetween. Finally, the provision of the two parallel vertically stretched conveyer belts necessitates that the subconveyer path have a great width. In operation, the system space allocated may be limited and thus too great a width is undesirable.

Copending applications Ser. No. 716,170 filed on Mar. 26, 1985 now abandoned, continued as Ser. No. 009043 filed Jan. 27, 1987 now abandoned and continued as Ser. No. 250,986 filed Sept. 28, 1988 and now U.S. Pat. No. 4,919,054, and Ser. No. 822,235 filed Feb. 13, 1986 now U.S. Pat. No. 4,727,813, relate to the carrier body for a linear motor. Ser. No. 716,201 filed Mar. 26, 1985, now Pat. No. 4,665,349, and Ser. No. 808,114 filed Dec. 12, 1985 now U.S. Pat. No. 4,716,346 relate to the velocity control of a linear motor. Ser. No. 828,992 filed Feb. 13, 1986 and continued as Ser. No. 166,385 now U.S. Pat. No. 4,807,537 relates to the rail system for the main conveying path. All of the above applications are to Matsuo and assigned to Toshiba K. K.

Copending application Ser. No. 025,767 filed Mar. 13, 1987 now U.S. Pat. No. 4,770,302, relates to a system for detecting the weight of the carrier body to control the velocity. This application is to Funane and is assigned to Toshiba K. K.

U.S. Pat. No. 4,613,805 to Matsuo et al also deals with a method of controlling a linear motor.

SUMMARY OF THE INVENTION

It is an object of the present invention to provide a conveying apparatus for carrier cases containing articles, such that the carrier cases arrive at a combined input/output section by means of a subconveying path, and are automatically moved from a carrier case input position to a carrier case output position of the input/output section.

It is another object of the present invention to provide a conveying apparatus in which the covers of the carrier cases are automatically opened at the input/output section.

It is still another object of the present invention to provide a conveying apparatus in which the covers of the carrier cases are automatically closed before leaving the input/output section and returning to the subconveying path.

It is still another object of the present invention to provide a conveying apparatus which is compact.

It is still another object of the present invention to provide for the sterilization of the inside of the carrier cases when the articles are removed from the carrier cases after arrival at the input/output section.

It is still another object of the invention to provide a storage section to enable efficient transfer of carrier cases between the input/output section and the main conveyance path.

It is still a further object of the present invention to provide for the circular movement of carrier cases containing articles at the input/output section.

These objects are accomplished by providing a conveying apparatus including a main conveyance path for conveying articles between a plurality of stations. Each station includes a stop position located on the main conveyance path, a branch conveyance path which is adjacent to the stop position and an input/output section. Each station also has means for transferring the conveyed carrier cases from the stop position to a transferring position on a storage section of the branch conveyance path. The branch conveyance path includes both the storage section and a subconveying section which is between the storage section and the input/output section of the station, for conveying carrier cases therebetween. The storage section is horizontal and includes a pair of conveyer belts, one of which extends to the subconveying section which includes a vertically disposed conveyer belt. The input/output section provides user access to the branch conveyance path so that cases may be supplied to. or removed from the system.

In a second embodiment the input/output section may include additional storage locations for the cases. In the second embodiment, the input/output section includes means for automatically moving the cases in a U-shaped path from an output position of the input/output section to an input position. The U-shaped path serves as a temporary storage area. The input/output section has means for opening and closing the carrier cases as well as means for sterilizing the interiors of the cases.

The system may include one or more of each type of input/output section, each associated with one branch station. The number of stations located along the main conveyance path will be equal to both the number of subconveying sections and the number of input/output sections.

BRIEF DESCRIPTION OF THE DRAWINGS

FIG. 2a shows an open carrier case and FIG. 2b shows a closed carrier case;

FIG. 3 is a perspective view showing the conveying apparatus according to the present invention;

FIG. 8a is a perspective view showing a station including a stop position, branch conveyance path, transferring device and an input/output section according to one embodiment of the invention;

FIG. 8b is a sectional side view of the storage section and subconveying section of the branch conveyance path shown in FIG. 8a;

FIG. 10b is a schematic top view of the input/output section shown in FIG. 10a;

FIG. 11 is an explanatory view showing the operation of an opening device provided in the input/output section shown in FIG. 10a;

FIGS. 16a–16c are explanatory views showing the flow of carrier cases between the main conveyance path, and the input/output section according to the first embodiment when a carrier case arrives at a stop position from another station.

DETAILED DESCRIPTION OF THE PREFERRED EMBODIMENTS

Figure 1A:
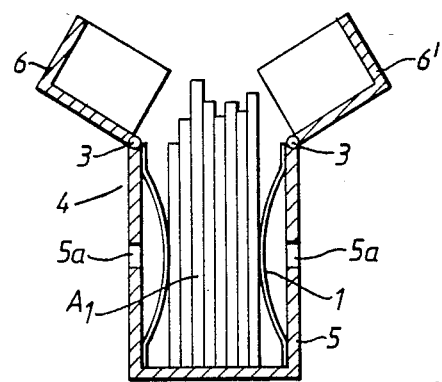
FIGS. 1a and 1b are sectional views of carrier cases for containing articles which are to be conveyed from one location to another.
Figure 1B:
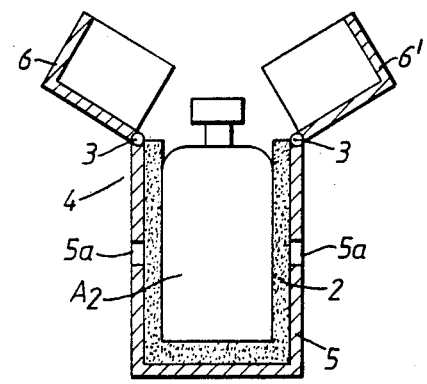

In FIGS. 1a and 1b, carrier cases 4 contain different types of articles to be conveyed, for example, charts, slips, or containers for liquid. Carrier cases 4 are substantially identical externally, however, they are internally adjusted to accommodate the articles which are to be contained and conveyed. For example, carrier case 4 in FIG. 1a is adapted for carrying paper articles and includes leafsprings 1 set face-to-face on the opposite inner surfaces of carrier case 4. Leafsprings 1 clip article A1 therebetween insuring a secure fit and providing for easy removal and replacement. In FIG. 1b, carrier case 4 is adapted for liquid containing bottle A2 which must be firmly grasped to prevent it from breaking. Inner case 2 is inserted between the inner walls of carrier case 4 and securely holds bottle A2 to prevent excessive vibration and shaking.

Figure 2A:
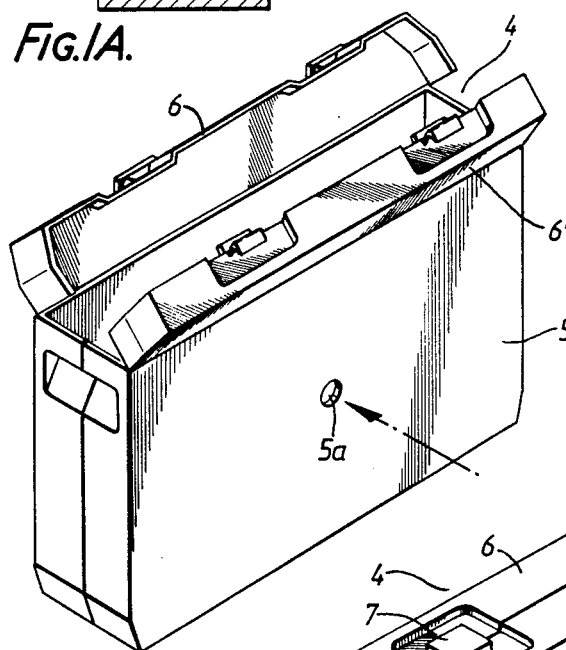
FIGS. 2a and 2b are perspective views of the carrier cases shown in FIGS. 1a and 1b where
Figure 2B:
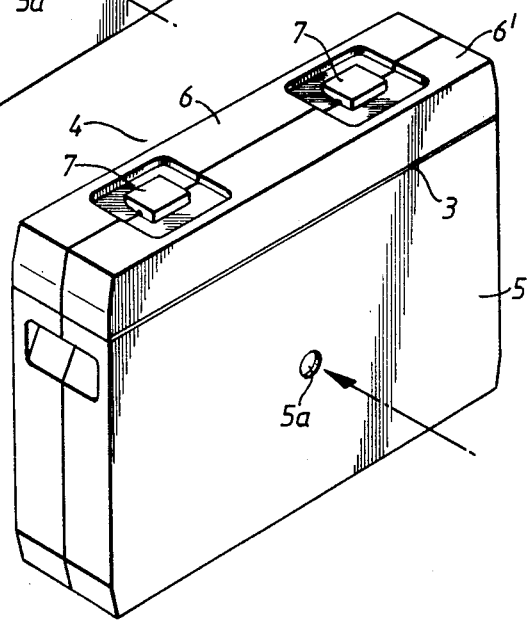

As shown in FIGS. 2a and 2b, carrier case 4 has a rectangularly shaped main body 5 with a top opening. A pair of covers 6 and 6' are latched by latches 7. Main body 5 is made of aluminum and covers 6 and 6' and latches 7 are made of stainless steel. Covers 6 and 6' are pivotally connected to main body 5 by hinges 3. Hinges 3 are elastic members which urge and maintain covers 6 and 6' in an open position. In order to remove the articles when body 5 is closed, latches 7 are released allowing covers 6 and 6' to open. Holes 5a are formed on each side wall of main body 5 so that a detector may detect whether a conveyed article is contained within carrier case 4. A photosensor may be used for detection.

FIG. 3 schematically shows a conveying apparatus installed in, for example, a hospital for conveying articles contained in carrier cases. Main conveyance path 11 conveys carrier cases 4 and is installed in the ceilings or under the floor of the various rooms to be reached by the system. A plurality of branch conveyance paths 12 or 12' extend from main conveyance path 11 into each room which is to be reached by the system, for example, the departments shown in FIG. 3. Branch conveyance paths 12 or 12' extend from main conveyance path 11 at a plurality of stop positions 22. Each branch conveyance path 12 extends to input/output section 40 while each branch conveyor path 12' extends to input/output section 46. Branch conveyance path 12 or 12', stop position 22, input/output section 40 or 46 and transferring device 23 (See FIGS. 6 and 7) together form a station. Station ST-A includes a first embodiment of input/output section 40 and a first embodiment of branch conveyance path 12 and station ST-B includes a second embodiment of input/output section 46 and a second embodiment of branch conveyance path 12'.

Each station is placed along the inner wall of each floor and is located to convey carrier cases 4 to places which are easy to reach in the rooms on each floor. The surgical department and the ophthamologic department may be located on the second floor of the building and branch conveyance paths 12' for these departments are shown extending upwardly from main conveyance path 11 while the other departments are located on the first floor and their branch conveyance paths 12 are shown extending downwardly.

Figure 4:
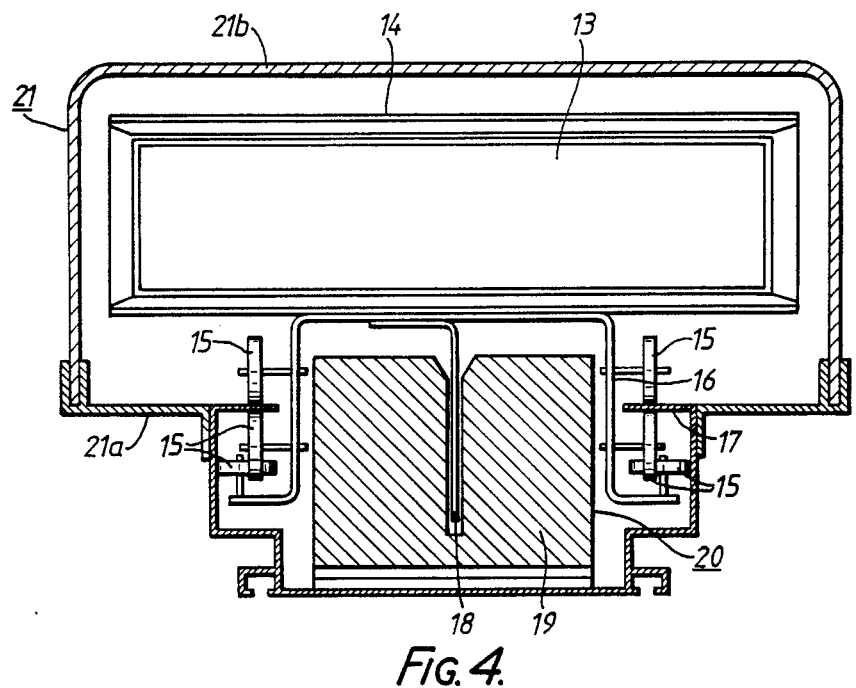
FIG. 4 is a cross-sectional view of the main conveyance path of the conveying system shown in FIG. 3.

As shown in FIG. 4, main conveyance path 11 conveys carrier body 14 having holding section 13 which holds one carrier case 4. Carrier body 14 is supported by support member 16 within main conveyance path 11. Guide rollers 15 are located above and below guide rail 17 near each side of conveyance path 11. Third guide roller 15 on each side is perpendicular to the other two on the same side and contacts a side wall. Thus carrier body 14 rolls along guide rail 17 and the side wall. Carrier body 14 moves at high speed within main conveyance path 11.

Reaction plate 18 extends downwardly from the lower surface of support member 16. Stators 19 are arranged within main conveyance path 11 at specified distances and contain a groove into which reaction plate 18 is inserted. Reaction plate 18 and stators 19 together form linear motor 20. Reaction plate 18 is a secondary conductor and stators 19 are primary conductors. When electric current is supplied to stators 19 from a power supply (not shown), a magnetic flux is created and applied through reaction plate 18. The intensity of the magnetic flux changes in time, and in a well known manner, reaction plate 18 is accelerated or decelerated within main conveyance path 11 according to the change in magnetic flux intensity. As a result, carrier body 14 can be driven. The construction and functioning of linear motor 20 which controls the movement of carrier body 14 is shown and discussed in detail in U.S. Pat. No. 4,613,805 to Matsuo et al, which is hereby incorporated by reference.

Casing 21 covers main conveyance path 11 and includes lower half 21a and upper half 21b which enclose the space in which carrier body 14 travels. Upper half 21b is located above carrier body 14 and lower half 21a is located below carrier body 14. Inspection and maintenance of main conveyance path 11 is facilitated by the fact that upper half 21b can be detached from lower half 21a.

Stators 19 are located at each stop position 22 along main conveyance path 11 where branch conveyance paths 12 are branched off as shown in FIG. 8A. Carrier body 14 may be selectively stopped at each stop position 22. At each stop position 22, transferring device 23 is provided for transferring carrier cases 4 from main conveyance path 11 to transferring position 39 of storage section 42. Transference of carrier cases 4 between main conveyance path 11 and branch conveyance path 12 is performed at stop position 22 by transferring device 23 under the control of a control circuit shown in FIG. 5. Transference of carrier cases 4 is performed automatically at stop position 22 by transferring device 23.

Figure 5:
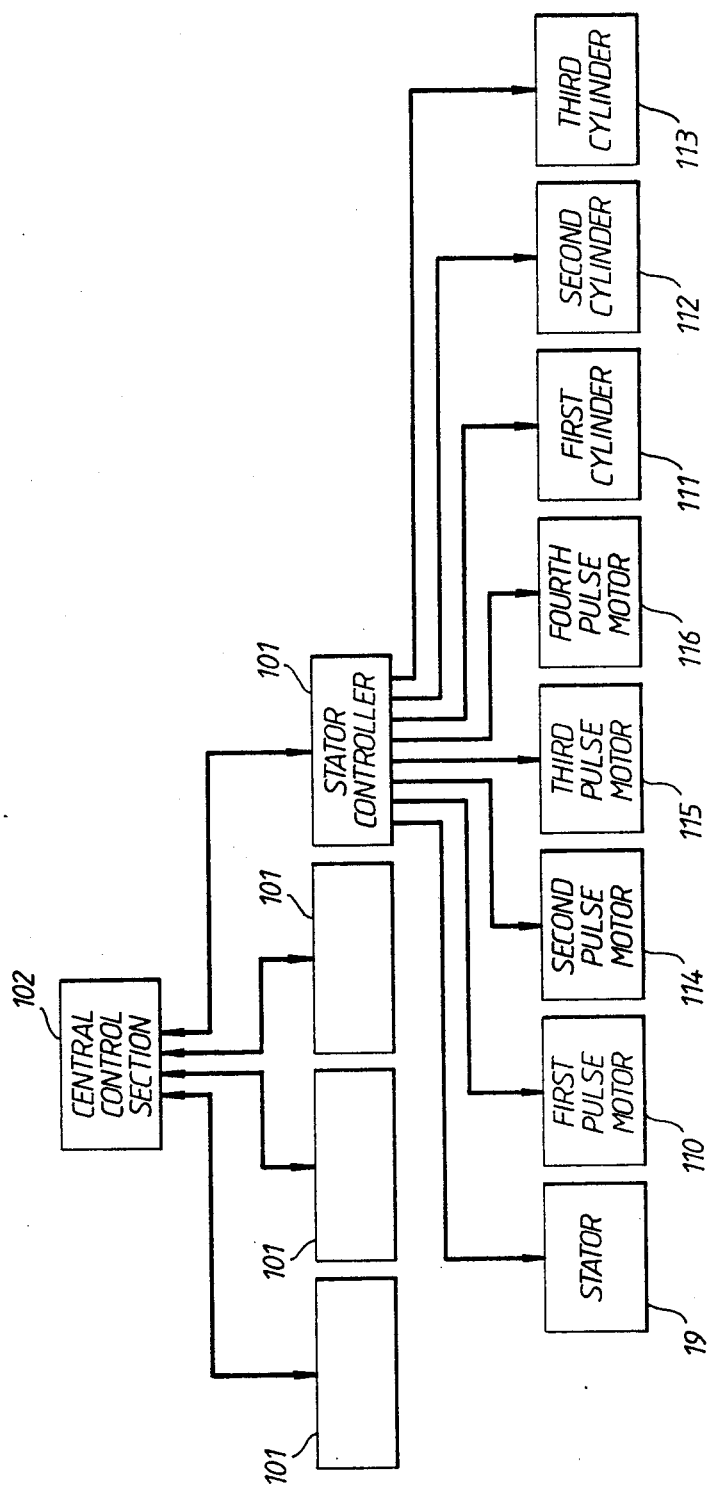
FIG. 5 is a block diagram showing a control circuit used for the conveying apparatus.

The control circuit shown in FIG. 5 includes a plurality of stator controllers 101, each of which controls the movement of carrier body 14 at each stator 19, the transferring of carrier cases 4 at each stop position 22 and the movement of carrier cases 4 at each branch conveyance path 12. Central control section 102 controls all stator controllers 101. The control circuit allows carrier cases 4 to be conveyed in accordance with instructions from control panel 51 or 53. Each stator controller 101 controls one of stators 19 along with first pulse motor 110, second pulse motor 114, third pulse motor 115, fourth pulse motor 116, first cylinder 111, second cylinder 112 and third cylinder 113.

Figure 7:
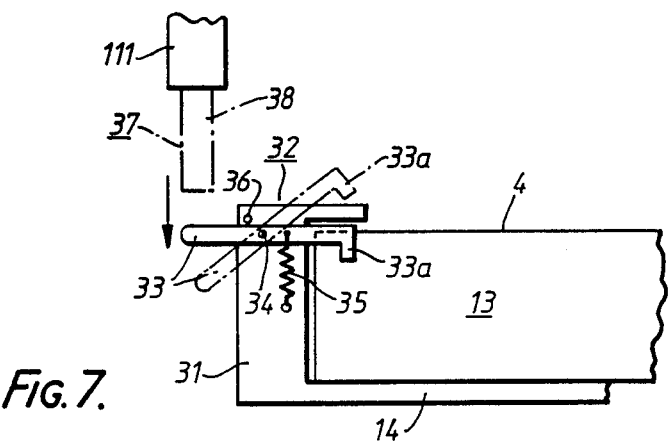
FIG. 7 is a front view of a carrier case fixing mechanism shown in the transferring device of FIG. 6.
Figure 6:
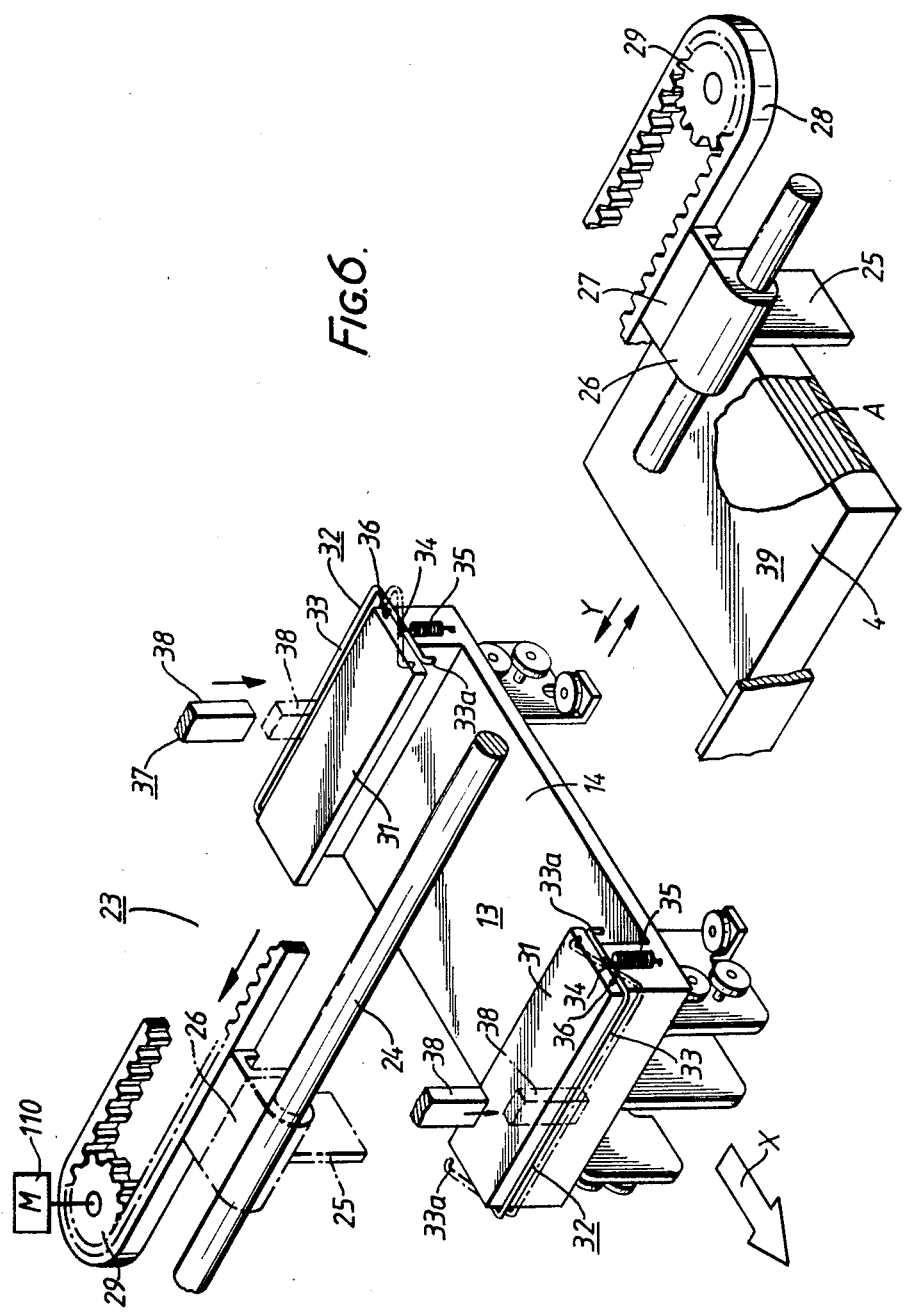
FIG. 6 is a perspective view of a carrier body and a transferring device located at a stop position near a branch conveyance path in the conveying apparatus of FIG. 3.

Transferring device 23 is shown in detail in FIGS. 6 and 7. Guide shaft 24 is provided perpendicularly to main conveyance path 11 and is located above the path of travel of carrier body 14 which moves in the X-direction. Guide shaft 24, although not shown in FIG. 4, would extend horizontally in the page and the X-direction of travel would be perpendicular to the page. Movable member 26 is attached to pushing plate 25 and is slidably mounted on guide shaft 24. Movable member 26 is also connected with timing belt 28 through connecting member 27. Timing belt 28 is located around pullies 29 placed near both ends of guide shaft 24 on either side of main conveyance path 11. One of pullies 29 is operatively connected with first pulse motor 110. The rotation of pulse motor 110 causes movable member 26 having push plate 25 to move reciprocatively in the Y-direction, perpendicular to the direction of travel of carrier cases 4.

Push plate 25 extends below guide shaft 24 which allows it to contact and push one side of carrier case 4 when movable member 26 moves along guide shaft 24. The forward movement of push plate 25 causes carrier case 4 which is held within holding section 13 of carrier body 14 to be pushed from holding section 13 to transferring position 39 of storage section 42 of branch conveyance path 12. Reverse movement of push plate 25 pushes case 4 from transferring position 39 into holding section 13 of carrier body 14.

Carrier body 14 has a pair of holding frames 31 extending therefrom and having an L-shaped cross section. Holding frames 31 cooperate to hold carrier cases 4 in holding section 13 of carrier body 14. Carrier cases 4 held within holding section 13 are immobile in both the X-direction and the vertical Z-direction due to holding frame 31, but are freely movable in the transferring or Y-direction.

Fixing mechanism 32 prevents carrier cases 4 from being dislodged from holding section 13 of carrier body 14 while being conveyed. Fixing mechanism 32 is provided on carrier body 14 and includes a pair of fixing members 33 connected to holding frame 31. Fixing members 33 are wire rods bent in a C-shaped configuration with downwardly bent ends 33a. Fixing members 33 rotate around a pair of pins 34 which protrude from the opposite sides of fixing members 33 and are inserted in holes in frames 31. Springs 35 urge fixing members 33 into a position abutting stoppers 36 protruding from one vertical side of holding frames 31. This position is represented by the solid lines in FIGS. 6 and 7 with bent ends 33a located within holding section 13 of carrier body 14. In this position, bent ends 33a abut on opposite vertical side surfaces of carrier cases 4 which are securely held within holding section 13 and are immobile in the Y-direction.

Each stop position 22 is further provided with a pair of release mechanisms 37 located on either side of carrier body 14 when it is centered in stop position 22 to release carrier cases 4 from fixing mechanism 32. Release mechanisms 37 have pushing rods 38. Pushing rods 38 are moved downwardly by first cylinder 111 and thereby abut and pushed down the middle portion of fixing members 33. As a result, fixing members 33 are rotated around pins 34 in a direction opposite to the rotational action provided by springs 35. Fixing members 33 are rotated into the position shown by the dot/dash lines in FIGS. 6 and 7. Free ends 33a are lifted out of holding section 13 of carrier body 14 and carrier cases 4 are no longer held within holding section 13 and can be moved in the Y-direction.

As shown in FIG. 8a, branch conveyance path 12 is adjacent stop position 22 and receives carrier cases 4 conveyed by main conveyance path 11. Branch conveyance path 12 includes both storage section 42, which further includes transferring position 39, and subconveying section 41. Storage section 42 is in generally the same plane as and is adjacent to stop position 22 to receive carrier cases 4 from main conveyance path 11 or to deliver carrier cases 4 to main conveyance path 11. Storage section 42 has space for accommodating six carrier cases 4 for temporary storage and is located in the ceiling or under the floor of the room in which it is to be used. Transferring position 39 is located on storage section 42 at a location adjacent stop position 22.

Subconveying section 41 is located between storage section 42 and input/output section 40 in order to convey carrier cases 4 therebetween. Subconveying section 41 includes carrier belt 41a which has vertical portion 41b and horizontal portion 41c which terminates near storage section 42. Storage section 42 includes first horizontal belt 42a, second horizontal belt 42c, first pusher 45A and second pusher 45B located at opposite corners of storage section 42.

First horizontal belt 42a is positioned around a pair of pulleys 42b and second horizontal belt 42c is adjacent to first horizontal belt 42a and is positioned around a pair of pulleys 42d. One of pulleys 42b is connected to third pulse motor 115 to move first horizontal belt 42a in a direction $X_1$ towards main conveyance path 11. One of pulleys 42d is connected to fourth pulse motor 116 to move second horizontal belt 42c in a direction $X_2$ away from main conveyance path 11.

Figure 9:
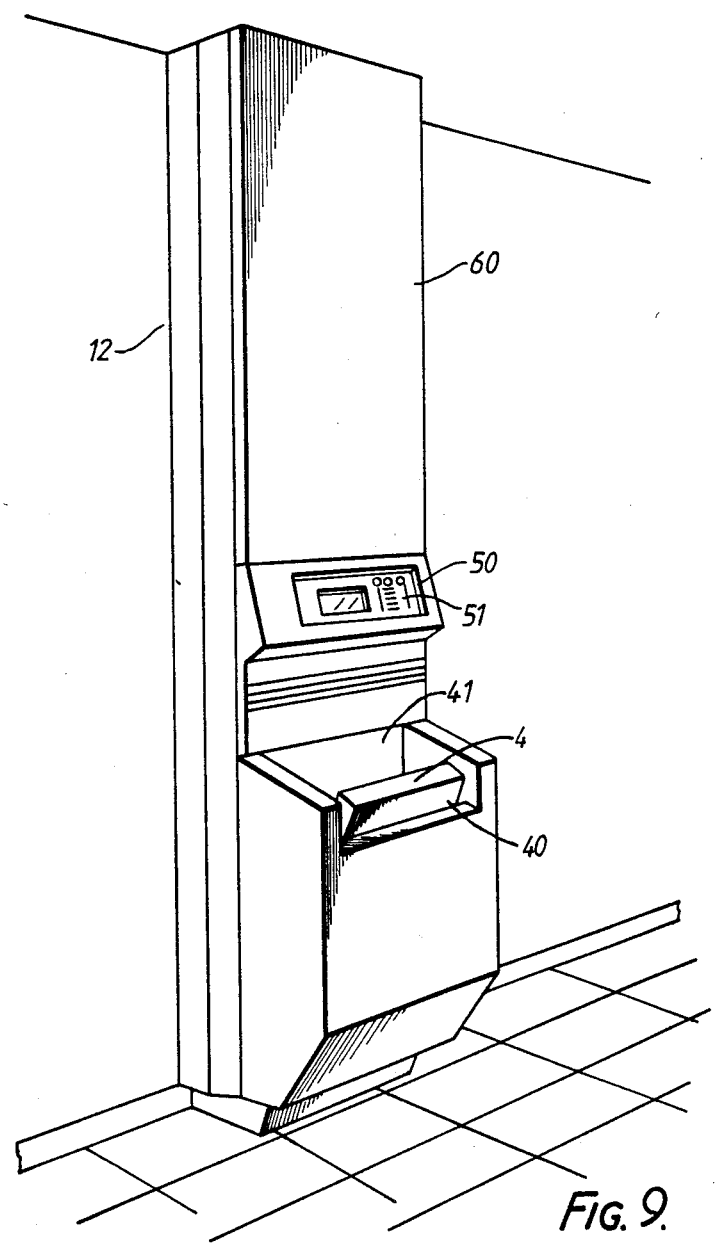
FIG. 9 is a perspective external view of a branch conveyance path and a first embodiment of an input/output section.

Carrier belt 41a of subconveying section 41 is positioned around a pair of pulleys 41e. One of pulleys 41e is located in generally the same plane as storage section 42 and the other of pulleys 41e is located at the bottom of subconveying section 41 and is connected to pulse motor 114 in order to selectively move vertical portion 41b in the upward Y1 or downward Y2 direction in the vertical plane and to move horizontal portion 41c in the corresponding $X_1$ or $X_2$ direction in the horizontal plane. Pairs of projecting claws 41d are mounted on carrier belt 41a and are spaced at intervals for sufficiently holding carrier cases 4 on carrier belt 41a so that they may be raised or lowered. As shown in FIG. 9, covering plate 60 secures carrier cases 4 within subconveying section 41 during vertical movement.

First pusher 45A is provided at one side of storage section 42 and second pusher 45B is provided at the other side. First pusher 45A is driven by second cylinder 112 and second pusher 45B is driven by third cylinder 113. First pusher 45A pushes carrier cases 4 when they are located on one end of first horizontal belt 42a to transfer carrier cases 4 from first horizontal belt 42a onto second horizontal belt 42c at transferring position 39. Second pusher 45B pushes carrier cases 4 to transfer them from second horizontal belt 42c onto horizontal portion 41c of carrier belt 41a when carrier case 4 is conveyed from transferring position 39 to a position in front of second pusher 45B by second horizontal belt 42c.

One of pulleys 29 is located within branch conveyance path 12 and guide shaft 24 extends within branch conveyance path 12. When push plate 25 moves to push carrier case 4 onto transferring position 39, push plate 25 moves far enough into branch conveyance path 12 to clear the width of a second carrier case 4 which is located at a position near pusher 45A. Push plate 25 maintains its position beyond transfer position 39 until a second carrier case 4 is pushed onto transfer position 39. Then, push plate 25 moves in the opposite direction to push the second carrier case 4 into holding section 13 of carrier body 14. After carrier body 14 moves clear of stop position 22, push plate 25 moves to its starting position on the opposite side of main conveyance path 11.

FIG. 9 shows a perspective view of branch conveyance path 12 and input/output section 40 installed on the floor of a designated department located on the first floor of the building. Input/output section 40 faces into the room and receives carrier cases 4 which have been carried from main conveyance path 11 to branch conveyance path 12. Alternatively, carrier cases 4 may have been placed within input/output section 40 by an operator. Carrier case 4 is carried to main conveyance path 11 by subconveying section 41 and storage section 42 of branch conveyance path 12 in conjunction with transferring device 23.

Control section 50 include control panel 51 provided above input/output section 40. A plurality of keys, an indicating lamp and a chime (not shown) are mounted on the surface of control panel 51. When carrier cases 4 arrive at input/output section 40, the indicating lamp and the chime of control panel 51 are lighted and sounded respectively in order to notify the operator of its arrival. A detector (not shown) for detecting whether covers 6 and 6' of carrier cases 4 are opened or shut is provided within input/output section 40. If carrier case 4 is placed within input/output section 40 and a destination is specified by making use of the plurality of keys on the control panel 51, the detector will detect whether covers 6 and 6' are shut. When the detector detects that covers 6 and 6' are shut, carrier case 4 is carried by carrier belt 41a upwards to storage section 42 and to its ultimate destination by main conveyance path 11.

Figure 10A:
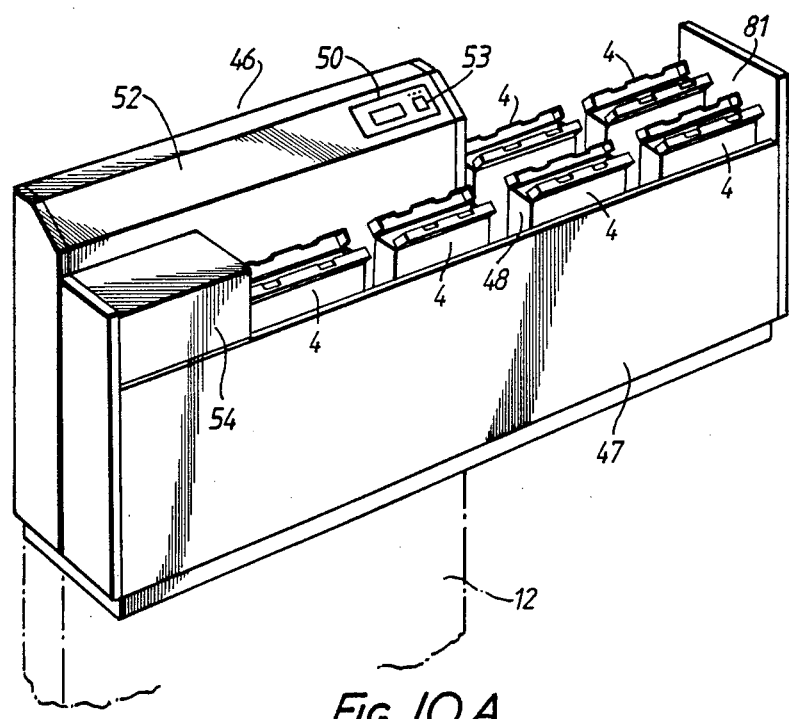
FIG. 10a is a perspective view of an input/output section according to a second embodiment of the invention.
Figure 10B:
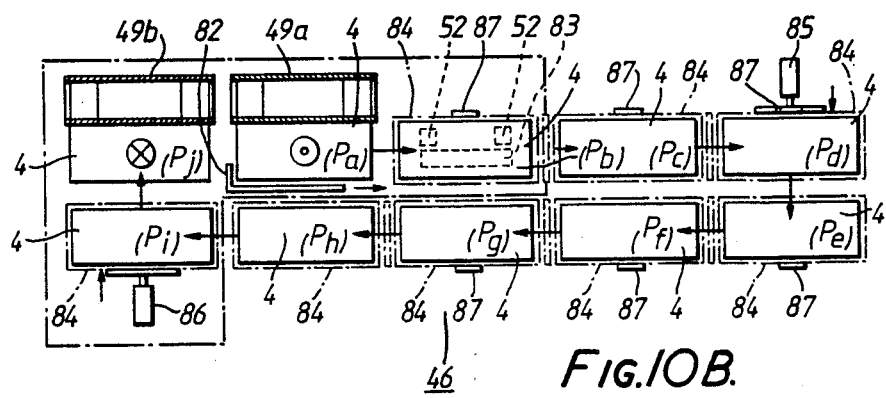

FIGS. 10a and 10b show a second embodiment of an input/output section and a branch conveyance path according to the invention. Input/output section 46 is installed on the floor of, for example, the surgical department which is located on the second floor of the hospital. Housing 47 is provided with opening 48 at its upper portion. Two separate and adjacent belts are provided beneath positions (Pa) and (Pj). Vertical belt 49a is disposed beneath position (Pa) and carries carrier cases 4 delivered from storage section 42' to input/output section 46. Adjacent belt 49a is vertical belt 49b located beneath position (Pj). Vertical belt 49b carries carrier cases 4 downwards from input/output section 46 towards storage section 42'. As viewed from a position to the left of input/output section 46 in FIG. 10a, belt 49a rotates counterclockwise while belt 49b rotates clockwise.

Figure 10C:
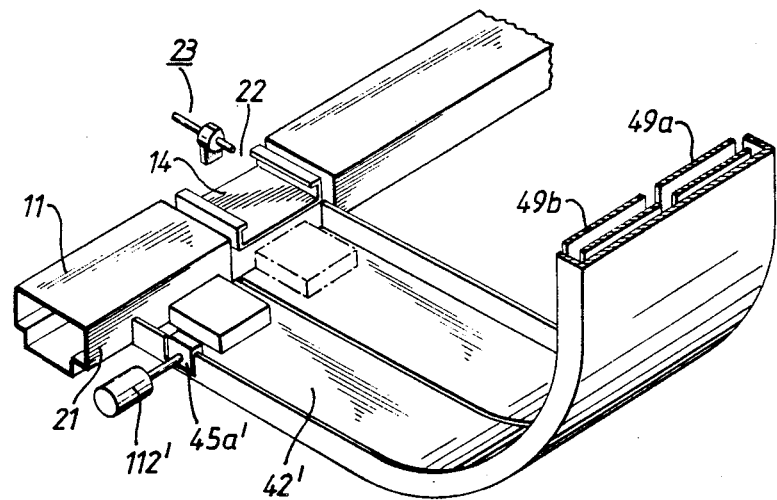
FIG. 10c is a perspective view of a stop position, branch conveyance path and transferring device according to a second embodiment of the invention.
Figure 10D:
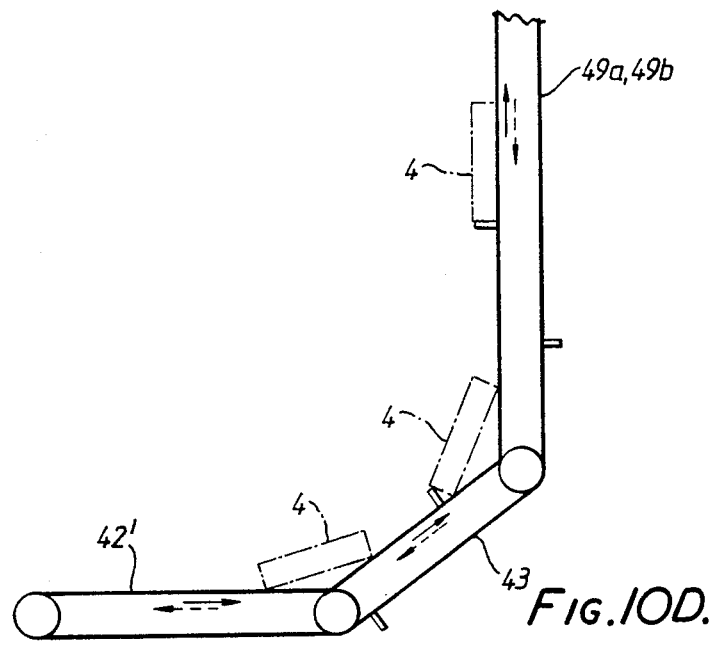
FIG. 10d is a sectional side view of the storage section and subconveying section of the branch conveyance path shown in FIG. 10c.

As shown in FIGS. 10c and 10d, branch conveyance path 12' includes both storage section 42', which further includes transfer position 39', and subconveying section 41'.

Storage section 42' includes two horizontal conveyor belts 42a and 42c'. Horizontal belt 42a' rotates counterclockwise and horizontal belt 42c' rotates clockwise. Subconveying section 41' includes subconveying belts 43a and 43c and vertical belts 49a and 49b. Subconveying belt 43a is located between horizontal belt 42a' and vertical belt 49b, and subconveying belt 43c is located between horizontal belt 42c' and vertical belt 49a. Belts 43a and 43c are inclined at an angle with respect to the plane of storage section 42' and functionally connect storage section 42' to vertical belts 49a and 49b. In the view of FIG. 10d, belt 43a rotates counterclockwise and belt 43c rotates clockwise.

Transferring position 39' is located adjacent stop position 22, and pusher 45a', which is driven by cylinder 112', located adjacent main conveyance path 11 and transfer position 39'. The remaining numbered elements in FIGS. 10c and 10d are identical with the same numbered elements in FIG. 8a and operate in the same manner. Stop position 22, transferring device 23 and branch conveyance path 12', which are all shown in FIG. 10c, and input/output section 46 shown in FIGS. 10a and 10b, together comprise station ST-B of FIG. 3.

Carrier cases 4 are transferred by transferring device 23 onto transferring position 39'. Horizontal belt 42c' transports carrier cases 4 to subconveying belt 43c which transports carrier cases 4 to the lower end of vertical belt 49a. Vertical belt 49a transports carrier cases 4 delivered from belt 43c to position (Pa) of input/output section 46.

Vertical belt 49b transports carrier cases 4 from position (Pj) of input/output section 46 to the upper end of inclined conveying belt 43a which transports cases 4 to horizontal belt 42a. Horizontal belt 42a' transports cases 4 delivered from belt 43a to a position in storage section 42' in front of pusher 45a'. Pusher 45a' is driven by cylinder 112' to push carrier cases 4 onto transferring position 39'. Transferring device 23 acts as described above with respect to FIG. 6 to transfer cases 4 onto stop position 22.

L-shaped pusher 82 is located at position (Pa) and transfers carrier cases 4 carried by vertical belt 49a to position (Pb) which is located adjacent and to the right of position (Pa). At position (Pb), opening device 52 shown in FIG. 11 and described below is provided for opening covers 6 and 6'. An ultraviolet sterilization device 83 is also provided at position (Pb) for sterilizing the inside of carrier cases 4 if they arrive empty at input/output section 46. If carrier cases 4 arrive with conveyed articles, then sterilization device 83 does not operate.

Transfer belts 84 are provided at positions (Pb) through (Pi) to transfer carrier cases 4 successively as shown by the arrows in FIG. 10b. Belts 84 constitute a U-shaped conveyance path on which carrier cases 4 are arranged within housing 47. Positions (Pc) through (Ph) constitute temporary storage section 81 and at any of these positions, an operator may remove articles from carrier cases 4 or place articles in carrier cases 4. Transfer belts 84 horizontally convey carrier cases 4 along temporary storage section 81.

Pusher 85 is provided at position (Pd) and transfers carrier cases 4 to position (Pe) in a direction perpendicular to the movement of transfer belts 84. Pusher 86 is provided at position (Pi) to transfer carrier cases 4 to position (Pj). Photosensors 87 are provided in the wall of housing 47 at positions (Pb) through (Pg) and detect whether conveyed articles are contained within carrier cases 4. Referring to FIGS. 2a and 2b, carrier cases 4 are provided with hole 5a on one side thereof. The side with hole 5a faces photosensor 87 and a mirror (not shown) is provided on the inner wall of case 4 on the side opposite hold 5a. Photosensor 87 includes a light source (not shown) and a photoreceiver (not shown) adjacent thereto. Light from the light source is reflected off of the mirror when carrier case 4 is empty and detected by the photosensor. However, when an article is contained in carrier case 4, the light from the light source is either scattered by the article or not reflected at all. In either case, the light is not detected by the photosensor which indicates that carrier case 4 is empty. In order to ensure that photosensors 87 can function to detect articles when facing either side of carrier cases 4, a second mirror may be located below hole 5a on the first side, and a second hole may be located on the second side opposite the second mirror and below the first mirror. In this manner, photosensor 87 can function to detect articles at any one of positions (Pb) through (Pg).

Positions (Pa), (Pb), (Pj), and position (Pi) are covered by cover members. Closing device 54 is provided at position (Pi) to close covers 6 and 6' of carrier cases 4 which have been transferred from position (Ph). Opening device 52 is provided at position (Pb) to open cases 4 conveyed by belt 49a.

Figure 11:
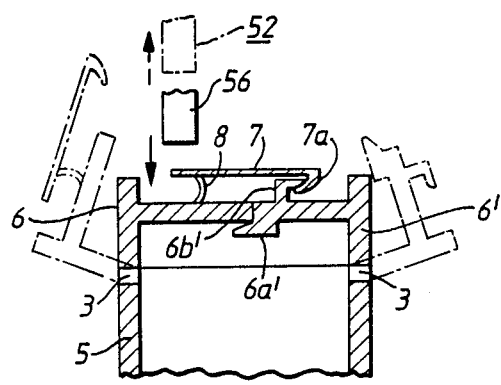

The functioning of opening device 52 is described with respect to FIG. 11 which shows carrier cases 4 having covers 6 and 6' with latch 7. Leafspring 8 is provided between one end of latch 7 and the upper surface of cover 6 and functions as a swingable hinge. The other end of latch 7 has forked portion 7a which engages with claw 6b' formed on an upper surface of cover 6'. Projection 6a' is formed at the edge and beneath cover 6' and functions to support the edge of cover 6 when covers 6 and 6' are engaged to close main body 5 of carrier cases 4. Opening device 52 includes pushing member 56 and a moving member (not shown) which moves pushing member 56 in the vertical direction.

When covers 6 and 6' are engaged to close carrier cases 4, the hinged portion of latch 7 is positioned beneath pushing member 56, which is moved downwardly and pushes the hinged portion of latch 7, as shown by the solid line in FIG. 11. As a result, forked portion 7a is disengaged from claw 6b'. Hinges 3 are provided on covers 6 and 6' and urge covers 6 and 6' to rotate to the position shown by the dash lines in FIG. 11, and thus to open carrier cases 4. When the forked portion 7a is disengaged from claw 6b', covers 6 and 6' are automatically rotated to the opened position as shown by the dashed lines in FIG. 11.

Figure 12A:
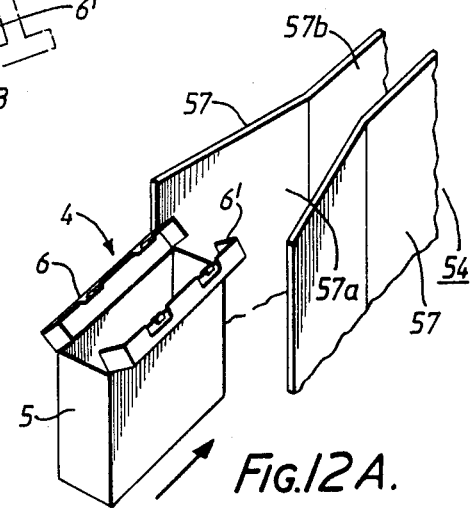
FIGS. 12a–12c are explanatory views showing the operation of a closing device provided in the input/output section shown in FIGS. 10a and 10b.
Figure 12B:
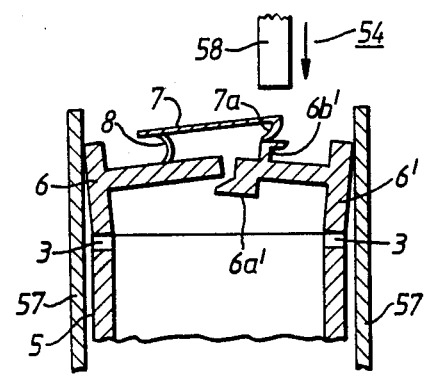
Figure 12C:
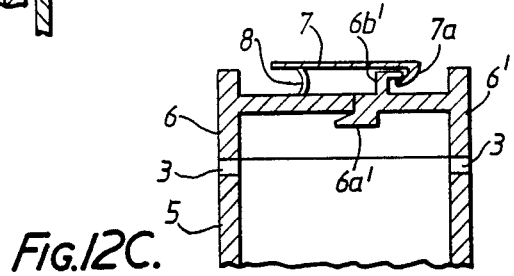

Covers 6 and 6' of carrier cases 4 are closed through the operation of closing device 54 provided in input/output section 46 as shown in FIGS. 12a–12c. Closing device 54 has a pair of side walls 57, pusher 58 and a moving member (not shown) for moving pusher 58 in the vertical direction. Side walls 57 are opposite each other and form a space through which carrier cases 4 are moved. One end of each side wall 57 is inclined outwardly to form a wide spaced portion 57a therebetween. Spaced portion 57b is formed between two parallel sections of side walls 57 and is narrower than portion 57a. Carrier cases 4 with opened covers 6 and 6' pass through wide space portion 57a and move within the space provided between side walls 57 until they reach narrower portion 57b which forces covers 6 and 6' to close. In this closed position, the edge of cover 6 touches edge portion 6a' of cover 6'. Forked portion 7a contacts the tip of claw 6b' as shown in FIG. 12b. Pusher 58 is positioned above forked portion 7a and is moved downward to push forked portion 7a which fully engages below claw 6b' and thus locks covers 6 and 6' in the closed position.

With further reference to FIG. 10a and 10b, the operation of input/output section 46 will be described. Carrier cases 4 containing conveyed articles are carried by vertical belt 49a to position (Pa). Pusher 82 pushes carrier cases 4 towards position (Pb), and at position (Pb) carrier case 4 is placed on transfer belts 84. Position (Pb) thus acts as an output position for receiving conveyed cases 4. At position (Pb), opening device 52 acts to open covers 6 and 6' of carrier cases 4. Ultraviolet sterilization device 83 will not operate if photosensor 87 detects that conveyed articles are located within carrier cases 4. If photosensor 87 detects that conveyed articles are not located within carrier cases 4, ultraviolet sterilization device 83 will operate to sterilize the inside of carrier cases 4. Thereafter, carrier case 4 is transferred to position (Pc) by the movement of transfer belts 84. A chime is mounted on control panel 53, and when carrier case 4 is moved to position (Pc) the chime sounds to indicate that carrier case 4 contains articles which must be removed.

After conveyed articles are removed from carrier case 4, photosensor 87 at position (Pc) detects that carrier case 4 is vacant and as a result, the chime stops. If a successive carrier case arrives at position (Pb), vacant carrier case 4 located at (Pc) is then transferred toward position (Pd) by the movement of transfer belts 84. Vacant carrier cases 4 will remain at position (Pć) until a successive carrier case 4 arrives at position (Pb). Therefore, carrier cases 4 are advanced whenever successive carrier cases 4 arrive at position (Pb) by means of vertical belt 49a which delivers carrier cases to position (Pa). Carrier cases 4 are transferred from position (Pd) to position (Pe) by pusher 85 and are conveyed by belts 84 to positions (Pf) through (Ph).

Position (Ph) is an input position where carrier cases 4 containing articles to be conveyed are placed. Carrier cases 4 containing an article to be conveyed are either placed within input/output section 46 at position (Ph), or a vacant case 4 already located at position (Ph) is filled with an article. The operator specifies the destination on control panel 53 and pushes the "START" button, and carrier case 4 is moved toward closing device 54 at position (Pi) by belt 84. At position (Pi), covers 6 and 6' of carrier cases 4 are automatically closed by closing device 54. Then carrier case 4 is transferred toward position (Pj) by the action of pusher 86. At position (Pj), carrier case 4 is carried downward toward main conveying path 11 by vertical belt 49b. Positions (Pc) through (Pg) are used as temporary storage locations for carrier cases 4 which are kept open. Positions (Pb) through (Ph) form a U-shaped configuration with carrier cases 4 rotating around the U.

Figure 13:
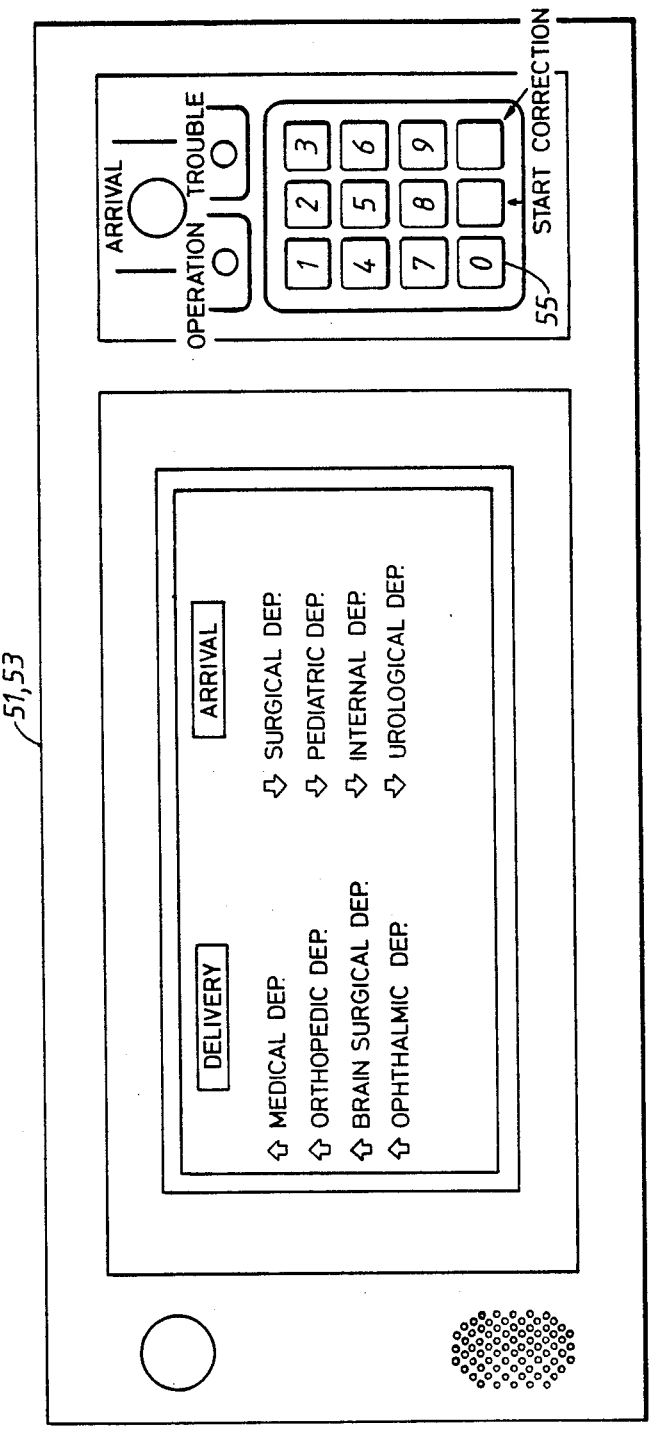
FIG. 13 is a front view of the control panel located at each station.

FIG. 13 shows an embodiment of control panel 51 or 53 installed at input/output sections 40 and 46 respectively of stations ST-A or ST-B. Arrow marks next to the corresponding names of addresses of arrival and delivery stations are listed on the basis of the order in time in which the request for conveyance was inputted into the system for carrier cases 4 which are temporarily accumulated in either branch conveyance path 12 including both storage section 42 and subconveying section 41, and first input/output section 40 of station ST-A, or branch conveyance path 12' including both storage section 42' and subconveying section 41', and temporary storage section 81 of second input/output section 46 of station ST-B.

In FIG. 13, the address "MEDICAL DEP." and the corresponding upwardly pointing arrow adjacent thereto are located in the column entitled "DELIVERY" and indicate that the order to send a first carrier case to the medical department is the oldest order and that this case 4 is still located in branch conveyance path 12 in this station. The address "OPHTHALMIC DEP" and its associated arrow are at the bottom of the same column and indicate that the order to send a second carrier case to the ophthalmic department is the newest order and that this carrier case is still located in branch conveyance path 12 of this station. Carrier cases 4 are conveyed in order from branch conveyance path 12 or 12' to main conveyance path 11.

If a first carrier case which is indicated on control panel 51 to be going to the medical department leaves branch conveyance path 12 and is transferred to main conveyance path 11, the indication of "MEDICAL DEP." and its associated arrow mark are extinguished. Simultaneously, the three remaining indications in the DELIVERY column are shifted upward.

If an operator places another carrier case in either first input/output section 40 or second input/output section 46, and inputs the digital code number on digital keyboard 55 which corresponds to the department where the operator wants this carrier case sent, then the name of the department and the corresponding upwardly pointing arrow is added to the bottom of the column entitled "DELIVERY".

The address "UROLOGICAL DEP." has an associated downwardly pointing arrow are located in the column entitled "ARRIVAL" and indicate that a carrier case coming from the urological department corresponds to the oldest order for arrival when the carrier case arrives from the urological department and is located in branch conveyance path 12 or 12' of this station. Similarly, the address "SURGICAL" and its associated downwardly pointing arrow indicate that the order for sending a carrier case from the surgical department is the newest and that a carrier case arriving from the surgical department is located in branch conveyance path 12 or 12' of this station. The entries under the heading "ARRIVAL" are inputted on digital keyboard 55 from stations other than this station. If an operator removes an article from a carrier case or removes a carrier case from first or second input/output section 40 or 46, the indication "UROLOGICAL DEP." and its associated arrow mark are removed from control panel 51 or 53. If arrow marks and addresses are not indicated, a single vacant carrier case is stored in storage section 42 or temporary storage section 81 of second input/output section 46.

Digital keyboard 55 is used to input the address of the desired location to which the carrier case is to be sent. When the start button is pushed, a carrier case is conveyed. It is also possible to change the desired address by pushing the correction button and inputting the corrected code number of the address which is indicated on control panel 51 or 53.

Figure 14A:
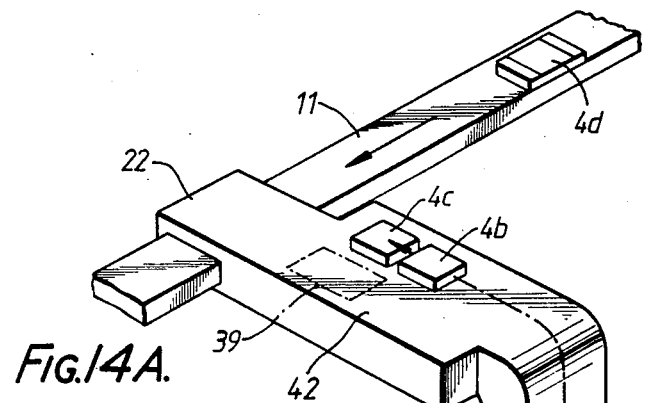
FIG. 14a–14c are explanatory views showing the flow of carrier cases between the main conveyance path and the input/output section according to the first embodiment.
Figure 14B:
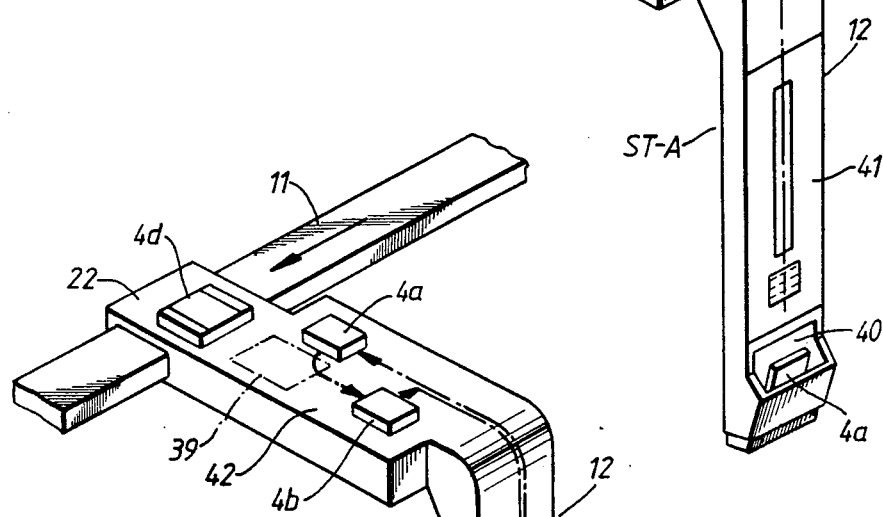
Figure 14C:
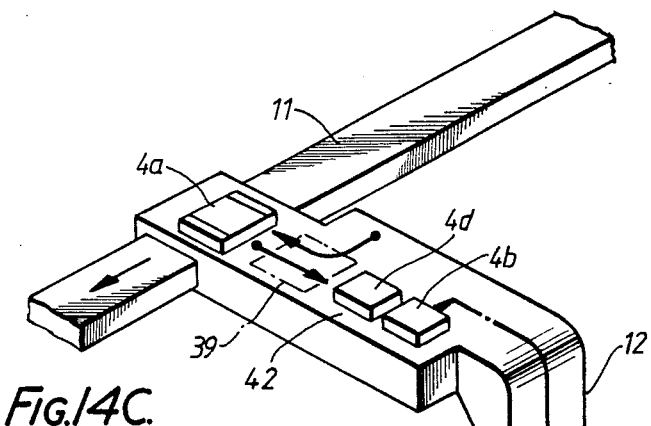
Figure 15A:
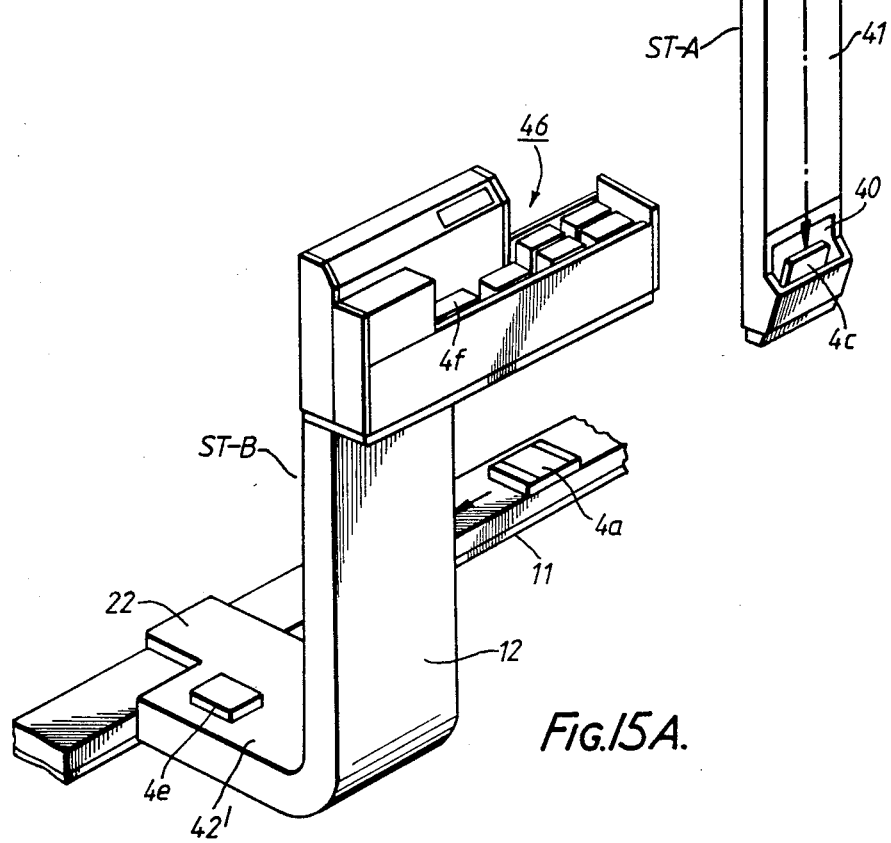
FIG. 15a–15c are explanatory views showing the flow of carrier cases between the main conveyance path and the input/output section according to the second embodiment.
Figure 15B:
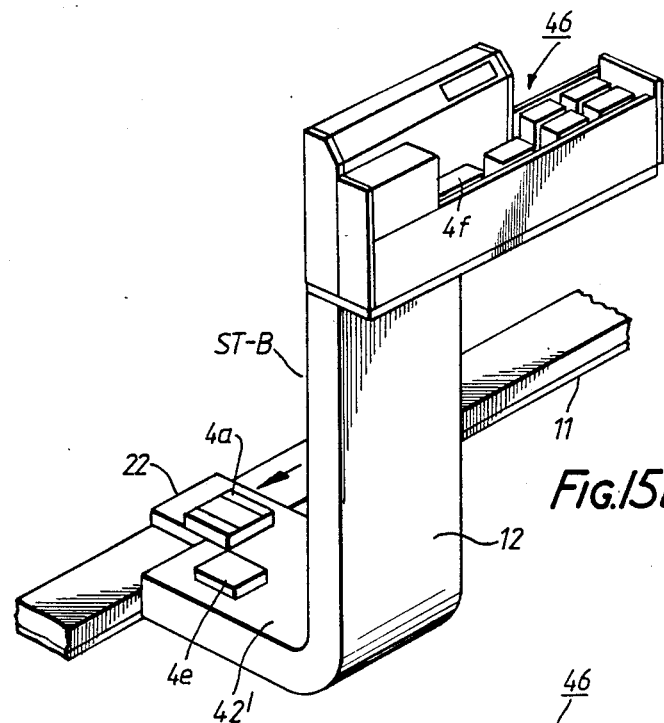
Figure 15C:
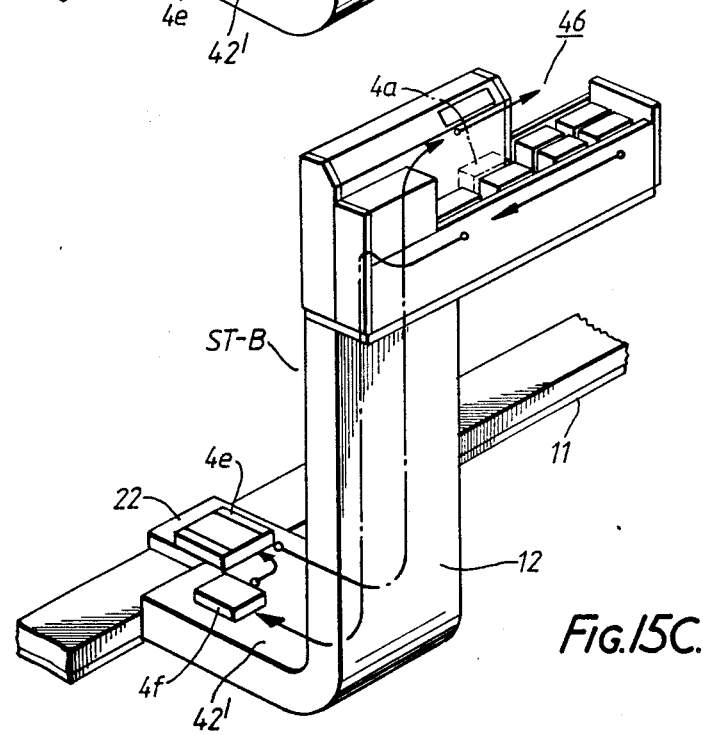

FIGS. 14a through 14c show the conveyance of cases at branch conveyance path 12 of station ST-A installed in the medical department located on the first floor of the building shown in FIG. 3 These Figures show the route taken by case 4a from input/output section 40 to main conveyance path 11 and the corresponding shifting of other cases. FIGS. 15a through 15c show the similar operation for carrier case 4a carried from station ST-A to, for example, station ST-B in the surgical department located on the second floor as shown in FIG. 3. FIGS. 16a–6b show the operation when carrier case 4a arrives at a second station ST-A with input/output section 40 of the first embodiment.

FIG. 14a shows first carrier case 4a containing articles to be conveyed from station ST-A to station ST-B, and second and third empty carrier cases 4b and 4c which have been previously conveyed by carrier belt 41a to the horizontal portion 41c of subconveying section 41 and onto belt 42a of storage section 42 as shown in FIG. 14a. Belt 42a successively moves carrier cases 4b and 4c towards first pusher 45A which then transfers carrier case 4c to the left side of storage section 42. Carrier case 4c is moved by belt 42c to a position near pusher 45B on the opposite corner of storage section 42.

After case 4c is moved to the opposite corner of section 42 by belt 42c, case 4b is moved to a position near pusher 45A thereby making room on storage section 42 for case 4a. Case 4a is then conveyed upward by belt 41a to a position previously held by case 4b on the edge of belt 42a of storage section 42. Pusher 45A actuates to move case 4b to the left and case 4a moves to the position near pusher 45A through the movement of belt 42a. Pusher 45B actuates to move case 4c to the right onto horizontal portion 41c where it is conveyed downwardly by belt 41a and assumes a position in input/output section 40. Belt 42c moves case 4b to the position near pusher 45B previously held by case 4c. Simultaneously, carrier case 4d arrives at stop position 22 from another section. Thus the cases assumes the positions shown in FIG. 14B.

Carrier case 4d is transferred onto transferring position 39 by transferring device 23 and is moved by belt 42c to a position adjacent case 4b and clear of case 4a which is moved to the left to transferring position 39 in front of stop position 22 by pusher 45A after belt 42c stops. Transferring device 23 moves in the reverse direction and transfers case 4a onto carrier body 14 to be conveyed. Thus the cases assume the positions shown in FIG. 14C.

FIGS. 15A through 15C show the transferring operation performed at Station ST-B when carrier case 4a arrives at stop position 22. Transferring device 23 transfers case 4a to the end of belt 42c'. Belt 43c moves carrier case 4a to the bottom of belt 49a where it is moved upwardly to position (Pa). As shown in FIG. 15c, case 4a will be moved to position (Pc) where its contents may be removed and examined. To accommodate case 4a, case 4f will be transferred downwardly to storage section 42' and case 4e is transferred onto carrier body 14. All of carrier cases 4 in input/output section 46 rotate one space along the U-shaped path. After the transferring operations are complete, each carrier body 14 will hold one carrier case 4 because at each stop position 22, if a case 4 is transferred to branch conveyance path 12 or 12', another case 4 will take its place. Therefore, the number of carrier cases 4 on main conveyance path 11 remains constant.

Figure 16C:
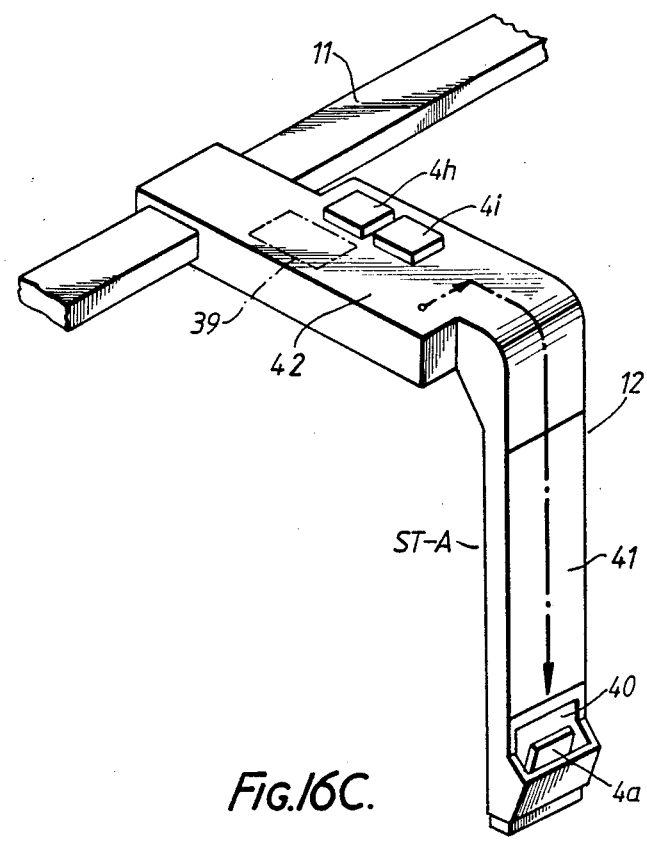

FIGS. 16A–16C show the operation at station ST-A when carrier case 4a arrives with a conveyed article. Cases 4g and 4h are on belt 42a of storage section 42 while case 4i is in input/output section 40. Case 4a is transferred by transferring device 23 to transferring position 39 and is then moved to a position near pusher 45B by belt 42c. Pusher 45A actuates and pushes case 4g to the left onto transferring position 39 and transferring device 23 reverses its motion and moves case 4g into holding section 13 of carrier body 14. Belt 41a then conveys case 4i upward to horizontal position 41c and then to the edge of belt 42a. Belt 42a moves case 4h to a position adjacent pusher 45A. The cases thus assume the positions shown in FIG. 16B. Case 4i has been moved clear of case 4a, therefore pusher 45B actuates and moves case 4a to horizontal portion 41c of belt 41a which is not moving. Belt 41a then rotates to move case 4a downward into input/output section 40 as shown in FIG. 16c.

We claim:

1. An apparatus for conveying reusable carrier cases each said carrier case having a cover and containing articles, said apparatus, comprising:
    a main conveyance path;
    carrier bodies propelled along said main conveyance path for conveying said carrier cases therein, said carrier cases removably insertable in said carrier bodies;
    a first input/output means located along said main conveyance path for receiving carrier cases transferred from said main conveyance path and for supplying carrier cases to be transferred to said main conveyance path, said carrier cases transferred to and from said carrier bodies;
    a second input/output means located along said main conveyance path and spaced from said first input/output means and comprising a carrier case output position for receiving carrier cases transferred from said main conveyance path and a carrier case input position for supplying carrier cases to be transferred to said main conveyance path, said carrier cases transferred to and from said carrier bodies, said main conveyance path coveying carrier cases inserted in said carrier bodies between said first input/output means and said second input/output means; and
    opening means provided near said carrier case output position at said second input/output means for opening the covers of said carrier cases when said covers are closed.

2. The apparatus recited in claim 1 wherein said covers are movable between an opened and a closed position and a releasable latch for maintaining the closed position.

3. The apparatus of claim 2 wherein said opening means includes means for automatically releasing said latch and said carrier cases comprise a hinge which urges said covers to the opened position.

4. The apparatus recited in claim 1 wherein said second input/output means includes detecting means to detect whether the carrier cases contain articles.

5. The apparatus recited in claim 4 wherein said second input/output means also includes means for sterilizing the inside of empty carrier cases.

6. The apparatus recited in claim 1 wherein;

said covers of said carrier cases comprise dual opposing covers biased by hinges to an open position, a releasable latch hinged on one said cover engaging a claw on the other said cover;

and said opening means includes a vertically movable pushing member for releasing said latch to allow said covers to open under the bias provided by said hinges.

7. The apparatus recited in claim 4 wherein;

said carrier cases contain holes located on opposing side walls thereof;

and said detecting means is a photosensor including a light source and a photoreceiver on said second input/output means, and a mirror provided on an inner wall of said carrier case, said light source emitting light into one of said holes and said photoreceiver detecting said light reflected off of said mirror when said carrier case is empty.

8. A apparatus for conveying reusable carrier cases, each said carrier case having a cover and containing articles, said apparatus comprising:

a main conveyance path;

carrier bodies propelled along said main conveyance path for conveying said carrier cases therein, said carrier cases removably insertable in said carrier bodies;

a first input/output means located along said main conveyance path for receiving carrier cases transferred from said main conveyance path and for supplying carrier cases to be transferred to said main conveyance path, said carrier cases transferred to and from said carrier bodies;

a second input/output means located along said main conveyance path and spaced from said first input/output means and comprising a carrier case output position for receiving carrier cases transferred from said main conveyance path and a carrier case input position for supplying carrier cases to be transferred to said main coveyance path, said carrier cases transferred to and from said carrier bodies, said main conveyance path conveying carrier cases inserted in carrier bodies between said first input/output means and said second input/output means; and closing means provided near said carrier case input position at said second input/output means for closing the covers of said carrier cases before conveyance when said covers are opened.

9. The apparatus recited in claim 8 wherein said covers are movable between an opened and a closed position, and a releasable latch for closing said carrier cases.

10. The apparatus recited in claim 9 wherein said closing means comprises means for automatically actuating said latch to close said carrier cases.

11. The apparatus recited in claim 8 wherein;

said covers of said carrier cases comprise dual opposing covers biased by hinges to an open position, releasable engaging means on said covers for maintaining said covers in a closed position against said bias;

and said closing means comprises a pair of walls opposing each other and a vertically movable pushing member, said walls each including an essentially parallel portion with a channel therebetween, and a portion inclined outwardly from said parallel portion to form a widened region of said channel therebetween, said carrier cases moving through said widened region to said channel to force said opposing covers into an essentially closed position, and said pushing member pushing said releasable engaging means to fully close said covers and engage said engaging means.

12. An apparatus for conveying carrier cases containing articles comprising:

a main conveyance path and a plurality of spaced apart stations located along said main conveyance path, said main conveyance path conveying articles between said stations;

at least a first station of said plurality further comprising a first stop position on said main conveyance path, a first branch conveyance path including a storage section adjacent said first stop position and a subconveying section adjacent said storage section, said subconveying section including a reversible conveyor belt and said storage section including two adjacent horizontal conveyor belts, said first station also comprising a first input/output section adjacent said subconveying section;

and at least a second station of said plurality further comprising a second stop position on said main conveyance path, a second branch conveyance path located adjacent said second stop position, and a second input/output section located adjacent said branch conveyance path, said second input/output section including a carrier case input position and a carrier case output position and means for automatically moving carrier cases therebetween.

13. The apparatus recited in claim 12 wherein said means for automatically moving carrier cases between said input position and said output position includes a plurality of transferring belts arranged in a U-shaped configuration within said second input/output section.

14. The apparatus recited in claim 13 wherein said reversible conveyor belt of said subconveying section is substantially vertically positioned and said two adjacent horizontal conveyor belts comprise a first belt having an end adjacent said first stop position and a second belt having an end adjacent one end of said subconveying section.

15. The apparatus recited in claim 14 wherein said end adjacent said first stop position is a transferring position.

16. The apparatus recited in claim 15 further comprising a transferring device at said first stop position for transferring articles between said main conveyance path and said transferring position.

17. The apparatus recited in claim 15 wherein said horizontal belts move in opposite directions.

18. The apparatus recited in claim 17 wherein said vertically positioned belt has a horizontal end portion adjacent said second horizontal belt.

19. The apparatus recited in claim 18 wherein said storage section comprises one pusher located at the end of said second horizontal belt opposite the end adjacent said subcoveying section, and a second pusher located at the end of said first horizontal belt opposite said transferring position.

20. The apparatus recited in claim 12 further comprising covers for said carrier cases and opening means provided near said output position for opening said covers of said carrier cases.

21. The apparatus recited in claim 12, said carrier cases further comprising covers, said apparatus further comprising closing means provided near said input position for closing said covers of said carrier cases, said carrier cases being reusable.

22. An apparatus for conveying carrier cases containing articles between a plurality of stations comprising:
   a main conveyance path and a plurality of at least three spaced apart stations located along said main conveyance path, said main conveyance path including a linear induction rail system, a plurality of carrier bodies propelled along said system, said carrier cases removably insertable in said carrier bodies, said main conveyance path conveying said carrier cases containing articles between said stations by propelling said carrier bodies when said carrier cases are inserted therein;
   a first station of said plurality comprising a first stop position on said main conveyance path, a first branch conveyance path including a storage section adjacent said first stop position and a subconveyance section adjacent said storage section, and a first input/output section adjacent said subconveyance section;
   a second station of said plurality comprisiong a second stop position on said main conveyance path, a second branch conveyance path located adjacent said second stop position, and a second input/output section located adjacent said second branch conveyance path;
   said main conveyance path conveying carrier cases between any one station to any other selected station, any one of said plurality of stations being selectable from any other of said stations.

23. The apparatus recited in claim 22 wherein said second input/output section includes a carrier case input position and a carrier case output position and means for atuomatically moving carrier cases therebetween.

24. An apparatus for conveying carrier cases containing articles between a plurality of stations comprising:
   a main conveyance path and a plurality of at least three spaced apart stations located along said main conveyance path, said main conveyance path including a linear induction rail system, a plurality of carrier bodies propelled along said system, said carrier cases removably insertable in said carrier bodies, said main conveyance path conveying said carrier cases containing articles between said station by propelling said carrier bodies when said carrier cases are inserted therein;
   a first station of said plurality comprising a first stop position on said main conveyance path, a first branch conveyance path including a storage section adjacent said first stop position and a subconveyance section adjacent said storage section, and a first input/output section adjacent said subconveyance section;
   a second station of said plurality comprising a second stop position on said main conveyance path, a second branch conveyance path located adjacent said second stop position, and a second input/output section adjacent said second branch conveyance path;
   said main conveyance path conveying carrier cases from either said first or said second station to a selected destination station, said selected destination station being either the other said station or any other of said plurality of stations, said destination station being selectable from either said first or said second station.

25. An apparatus for conveying carrier cases containing articles between stations comprising:
   a main conveyance path for conveying said carrier cases;
   a plurality of stations located along said main conveyance path, each station comprising a stop position on said main conveyance path and a branch conveyance path adjacent each said stop position, each said branch conveyance path further comprising a storage means located adjacent said stop position for temporarily storing said carrier cases, and transferring means for transferring carrier cases between said main conveyance path and said storage means at each stop position, said transferring means comprising a guide shaft provided perpendicularly to said main conveyance path, a movable member movable along said guide shaft and having a pushing plate extending down therefrom, said movable member attached to a timing belt located around a pair of pulleys, one of said pulleys operatively connected to a pulse motor to move said movable member along said guide shaft, said pushing plate pushing carrier cases between said stop position and said storage means when said movable member is moved.

26. An apparatus for conveying carrier cases containing articles between stations comprising:
   a main conveyance path for conveying said carrier cases, said carrier cases removably insertable in carrier bodies and said carrier bodies conveyed along main conveyance path, said carrier bodies including a fixing mechanism to hold said carrier cases in said carrier bodies during conveyance along said path;
   a plurality of stations located along said main conveyance path, each station comprising a stop position on said main conveyance path and a branch conveyance path adjacent each said stop position, each said branch conveyance path further comprising a storage means located adjacent said stop position for temporarily storing said carrier cases, and transferring means for transferring carrier cases between said main conveyance path and said storage means at each stop position, said transferring means comprising a guide shaft provided perpendicularly to said main conveyance path, a movable member movable along said guide shaft and having a pushing plate extending down therefrom, said pushing plate pushing carrier cases between said stop position and said storage means.

27. The apparatus recited in claim 26 wherein said fixing mechanism includes wire rods bent into a C-shaped configuration including downwardly bent ends extending into a holding section of said carrier bodies, said wire rods rotating around a pair of pins protruding from opposite sides thereof and inserted in holes in said carrier bodies, and springs urging said wire rods into a position holding said carrier cases in said carrier bodies.

28. The apparatus recited in claim 27 further comprising vertically movable pushing rods for contacting said wire rods to rotate them around said pins to release said carrier cases from said carrier bodies before said carrier cases are transferred from said carrier bodies to said storage means by said transferring means.

29. An apparatus for conveying reusable carrier cases with covers and containing articles comprising:
   a main conveyance path for conveying said carrier cases;

a first input/output means located along said main conveyance path for receiving carrier cases transferred from said main conveyance path and for supplying carrier cases to be transferred to said main conveyance path;

a second input/output means located along said main conveyance path and spaced from said first input/output means and comprising a carrier case output position for receiving carrier cases transferred from said main conveyance path and a carrier case input position for supplying carrier cases to be transferred to said main conveyance path, said second input/output means including detecting means for detecting whether said carrier cases contain articles, said main conveyance path conveying carrier cases between said first input/output means and said second input/output means; and opening means provided near said carrier case output position for opening the covers of said carrier cases when said covers are closed.

30. The apparatus recited in claim 29 wherein said second input/output means also includes sterilizing means for sterilizing the inside of empty carrier cases.

31. The apparatus recited in claim 29 wherein;
said carrier cases contain holes located on opposing side walls thereof;
and said detecting means is a photosensor including a light source and a photoreceiver on said second input/output means, and a mirror provided on an inner wall of said carrier case, said light source emitting light into one of said holes and said photoreceiver detecting said light reflected off of said mirror when said carrier case is empty.

32. An apparatus for conveying carrier cases containing articles comprising:
a main conveyance path and a plurality of spaced apart stations located along said main conveyance path, said main conveyance path conveying articles between said stations;
at least a first station of said plurality further comprising a first stop position on said main conveyance path, a first branch conveyance path including a storage section adjacent said first stop position and a subconveying section adjacent said storage section, said subconveying section including a reversible substantially vertically positioned conveyor belt and said storage section including two adjacent horizontal conveyor belts, said first horizontal belt having an end adjacent said first stop position and said second horizontal belt having an end adjacent one end of said subconveying section, said first station also comprising a first input/output section adjacent said subconveying section;
and at least a second station of said plurality further comprising a second stop position on said main conveyance path, a second branch conveyance path located adjacent said second stop position, and a second input/output section located adjacent said branch conveyance path, said second input/output section including a carrier case input position and a carrier case output position and carrier case moving means including a plurality of transferring belts arranged in a U-shaped configuration within said second input/output section for automatically moving carrier cases between said input position and said output position.

33. The apparatus recited in claim 32 wherein said end adjacent said first stop position is a transferring position.

34. The apparatus recited in claim 33 further comprising a transferring means at said first stop position for transferring carrier cases between said main conveyance path and said transferring position.

35. The apparatus recited in claim 32 wherein said horizontal belts move in opposite directions.

36. The apparatus recited in claim 32 wherein said vertically positioned belt has a horizontal end portion adjacent said second horizontal belt.

37. The apparatus cited in claim 33 wherein said storage section comprises one pusher located at the end of said second horizontal belt opposite the end adjacent said subconveying section, and a second pusher located at the end of said first horizontal belt opposite said transferring position.

38. An apparatus for conveying carrier cases containing articles comprising:
a main conveyance path and a plurality of spaced apart stations located along said main conveyance path, said main conveyance path conveying articles between said stations;
at least a first station of said plurality further comprising a first stop position on said main conveyance path, a first branch conveyance path including a storage section adjacent said first stop position and a subconveying section adjacent said storage section, said subconveying section including a reversible substantially vertically positioned conveyor belt and said storage section including two adjacent horizontal conveyor belts, said first horizontal belt having an end adjacent said first stop position and said second horizontal belt having an end adjacent one end of said subconveying section, said first station also comprising a first input/output section adjacent said subconveying section;
and at least a second station of said plurality further comprising a second stop position on said main conveyance path, a second branch conveyance path located adjacent said second stop position, and a second input/output section located adjacent said branch conveyance path, said second input/output section including a carrier case input position and a carrier case output position and means for automatically moving carrier case therebetween.

39. The apparatus recited in claim 38 wherein said end adjacent said first stop position is a tranferring position.

40. The apparatus recited in claim 39 further comprising a transferring means at said first stop position for transferring articles between said main conveyance path and said transferring position.

41. The apparatus recited in claim 38 wherein said horizontal belts move in opposite directions.

42. The apparatus recited in claim 38 wherein said vertically positioned belt has a horizontal end portion adjacent said second horizontal belt.

43. The apparatus recited in claim 39 wherein said storage section comprises one pusher located at the end of said second horizontal belt opposite the end adjacent said subconveying section, and a second pusher located at the end of said first horizontal belt opposite said transferring position.

44. An apparatus for conveying reusable carrier cases with covers and containing articles comprising:

a main conveyance path for conveying said carrier cases, said carrier cases comprising dual opposing covers biased by hinges to an open position, a releasable latch hinged on one said cover engaging a claw on the other said cover;

a first input/output means located along said main conveyance path for receiving carrier cases transferred from said main conveyance path and for supplying carrier casees to be transferred to said main conveyance path;

a second input/output means located along said main conveyance path and spaced from said first input/output means and comprising a carrier case output position for receiving carrier cases transferred from said main conveyance path and a carrier input position for supplying carrier cases to be transferred to said main conveyance path, said main conveyance path conveying carrier cases between said first input/output means and said second input/output means;

and opening means including a vertically movable pushing member for releasing said latch to allow said covers to open under the bias provided by said hinges.

45. An apparatus for conveying reusable carrier cases with covers and containing articles comprising:

a main conveyance path for conveying said carrier cases, said carrier cases comprising dual opposing covers biased by hinges to an open position, releasable engaging means on said covers for maintaining said covers in a closed position against said bias;

a first input/output means located along said main conveyance path for receiving carrier cases transferred from said main conveyance path and for supplying carrier cases to be transferred to said main conveyance path;

a second input/output means located along said main conveyance path and spaced from said first input/output means and comprising a carrier case output position for receiving carrier cases transferred from said main conveyance path and a carrier case input position for supplying carrier cases to be transferred to said main conveyance path, said main conveyance path conveying carrier cases between said first input/output means and said second input/output means;

and closing means for closing the covers of said carrier cases before transport, said closing means comprising a pair of walls opposing each other and a vertically movable pushing member, said walls each including an essentially parallel portion with a channel therebetween and a portion inclined outwardly from said parallel portion to form a widened region of said channel therebetween, said carrier cases moving through said widened region to said channel to force said opposing covers into an essentially closed position, and said pushing member pushing said releasable engaging means to fully close said covers and engage said engaging means.

* * * * *